United States Patent [19]

Oka et al.

[11] Patent Number: 4,600,200

[45] Date of Patent: Jul. 15, 1986

[54] THREE-DIMENSIONAL IMAGE DISPLAY SYSTEM

[75] Inventors: Masaya Oka; Sumio Nakagawa, both of Kawasaki, Japan

[73] Assignee: Ikegami Tsushinki Co., Ltd., Tokyo, Japan

[21] Appl. No.: 455,334

[22] Filed: Jan. 3, 1983

[30] Foreign Application Priority Data

Jan. 14, 1982 [JP] Japan .................................. 57-4139

[51] Int. Cl.[4] .................. A63B 71/00; G06F 15/626; G09B 9/08
[52] U.S. Cl. ................. 273/313; 273/1 GE; 273/1 GC; 273/DIG. 28; 434/43; 340/725; 340/729; 364/522
[58] Field of Search ............... 273/1 E, 1 GC, 85 G, 273/DIG. 28, 313; 434/43, 307, 323, 44; 340/725, 726, 729; 364/518, 521, 522

[56] References Cited

U.S. PATENT DOCUMENTS

| | | | |
|---|---|---|---|
| 3,998,532 | 12/1976 | Dykes | 434/44 |
| 4,093,347 | 6/1978 | LaRussa | 434/44 |
| 4,127,849 | 11/1978 | Okor | 364/522 |
| 4,209,832 | 6/1980 | Gilham et al. | 340/725 |
| 4,348,186 | 9/1982 | Harvey et al. | 434/44 |
| 4,368,517 | 1/1983 | Lovering | 434/43 |
| 4,384,338 | 5/1983 | Bennett | 340/729 |
| 4,475,132 | 10/1984 | Rodesch | 434/43 |
| 4,489,389 | 12/1984 | Beckwith et al. | 364/522 |

OTHER PUBLICATIONS

Guttag, K. et al. "Video Display Processor Simulates Three Dimensions", Electronics, Nov. 20, 1980, vol. 53, No. 25.

Primary Examiner—Richard C. Pinkham
Assistant Examiner—MaryAnn Stoll Lastova
Attorney, Agent, or Firm—Spencer & Frank

[57] ABSTRACT

A three-dimensional image display system comprising a video information memory, storing video information in the form of a perspective view, a reading circuit for reading out the video information stored in the video information memory while scrolling the stored video information in an oblique direction with respect to the perspective view, and a display for displaying in perspective the read out video information in such a way that the displayed picture is obliquely scrolled as time elapses.

19 Claims, 38 Drawing Figures

FIG_17
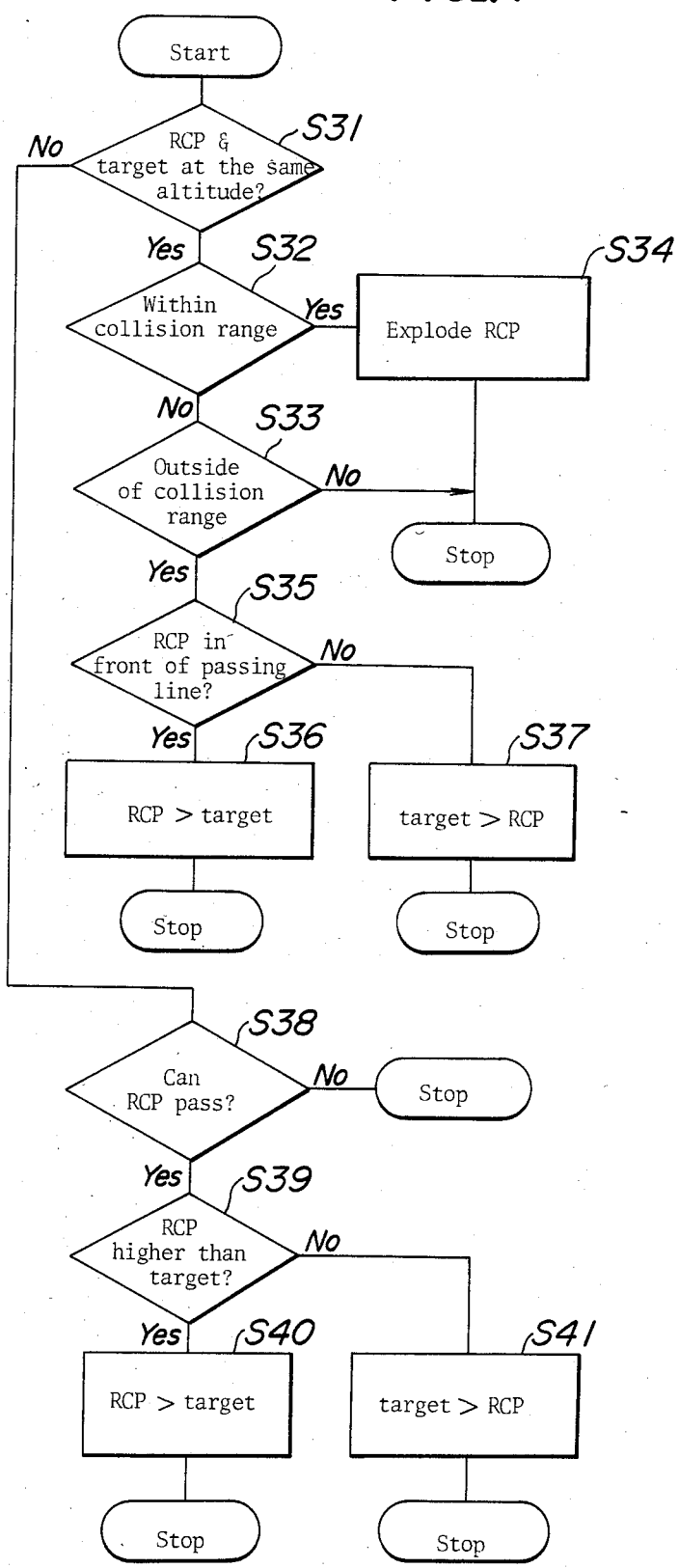

Vanishing Point

FIG_29

FIG_31

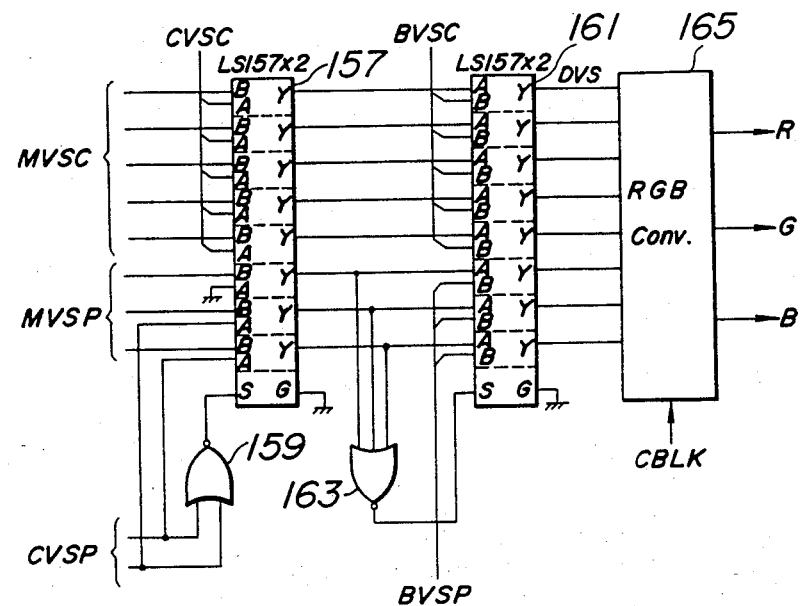
FIG_33

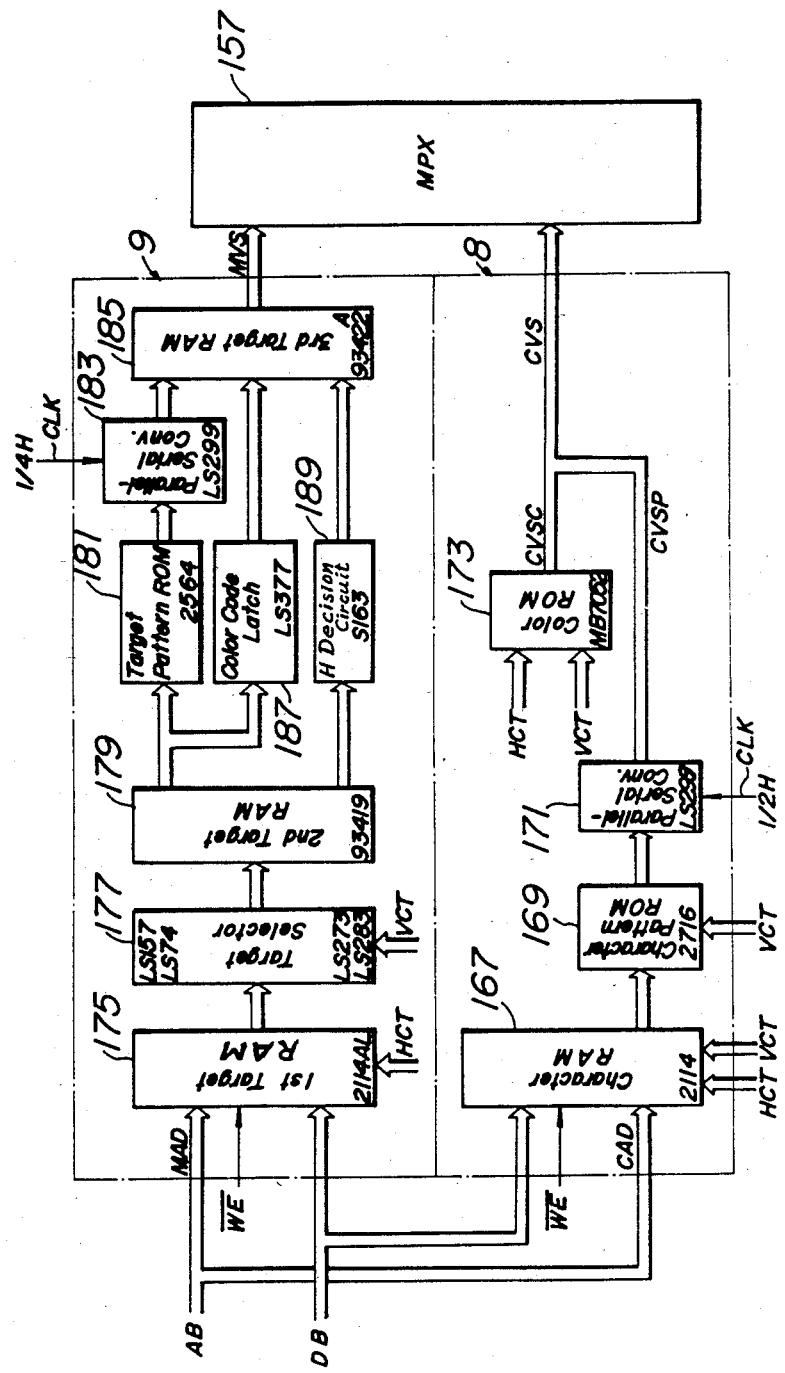

THREE-DIMENSIONAL IMAGE DISPLAY SYSTEM

BACKGROUND OF THE INVENTION

FIELD OF THE INVENTION

The present invention relates to a three-dimensional image display system, in which predetermined video information is displayed as an obliquely moving picture so that a three dimensional image can be realistically displayed in the form of two-dimensional view.

Computer display systems for displaying moving pictures for aircraft simulators or the like, special effect systems for displaying background scenes for special effects for television broadcasting system or motion-picture films or electronic game machines are required to display realistic pictures so that viewers feel as if they were in the three-dimensional space displayed. The prior art computer display system such as disclosed in U.S. Ser. No. 868,932, now U.S. Pat. No. 4,169,272, filed Jan. 12, 1978 is capable of displaying the scene of a stadium and desired symbols which move only in the horizontal or vertical direction so that the displayed picture is flat.

In order that a three-dimensional scene may be realistically transformed into a two-dimensional picture, it is preferable to display a perspective or projected view with a vanishing point. In addition, it is more preferable to display a background scene behind the scene of a stadium or the like in the direction of a perspective view; that is, in an oblique direction while displaying desired symbols or the like also in perspective. However, it has been very difficult to provide such a three-dimensional image display system capable of displaying a picture which is scrolled obliquely of a screen because memory means, each with an extremely high capacity, are needed and consequently the display system becomes very expensive in cost.

SUMMARY OF THE INVENTION

In view of the above, one of the objects of the present invention is to provide a three-dimensional image display system capable of displaying an obliquely scrolling picture even with memory means having small capacities, whereby the displayed picture becomes realistic and operators or players become tense as if they were in the real three-dimensional space displayed.

Another object of the present invention is to provide a three-dimensional image display system which can make full use of the features of objects in the background scene and moving objects by projecting the shadows of the moving objects over the background scene and causing them to pass over or collide with other objects such as building or wall on the ground, whereby the realistic representation can be more enhanced.

A further object of the present invention is to provide a three-dimensional image display system of the type described which can display stationary information in the regions or areas outside of the scrolling picture on the display screen so that the whole display screen can be fully utilized.

To the above and other ends, the present invention provides a three-dimensional image display system comprising video information memory means storing video information in the form of a perspective view, reading means for reading out the video information stored in the video information memory means while scrolling the stored video information in an oblique direction with respect to the perspective view, that is, in the longitudinal direction of the perspective view, and display means for displaying in perspective the read out video information in such a way that the displayed picture is obliquely scrolled as time elapses.

It is preferable in the present invention that the video information memory means comprises pattern memory means storing therein picture or image forming units and picture or image memory means storing therein the addresses of the picture or image forming units in the pattern memory means. The image forming units relate to a plurality of cells which form the video information. The reading means comprises position reference latching means for storing therein the image positions, with respect to the whole perspective view, of images to be displayed in a vertical scanning period, vertical adder means responsive to the image position data from the position reference latching means for offsetting vertical sync counts and horizontal adder means responsive to the vertical sync counts for offsetting horizontal sync counts. The picture or image memory means is accessed in response to the outputs from the vertical and horizontal adder means so that pattern data for each of the cells are read out from the pattern data memory means. The read out pattern data are temporarily stored and time sequentially read out again in synchronism with horizontal scanning so as to form a picture or image video signal which in turn is applied to the display means.

According to the present invention, predetermined data can be displayed on the screen in the data regions or areas outside the image regions or areas of the displayed picture which is obliquely scrolled.

Preferably, there may be provided data video display means for generating video signals for displaying the desired data in the data regions or areas on the display screen and moving object display means for generating video signals for displaying one or more moving objects which move with respect to the obliquely scrolled picture. The display means has priority selection means for selecting the priorities in the order of the data video signal, the moving object video signals and the picture or image video signal, so that the selected video signals can be displayed on the display screen in the order of the priorities.

It is also preferable that the moving object display means has means for generating, in addition to the above-described moving object video signals, video signals for casting the shadow or shadows of one or more moving objects over the obliquely scrolled picture in a manner that the shadow or shadows move in relation to the moving object.

The altitude of each of one or more moving objects with respect to the obliquely scrolled picture may preferably be computed and in response to the result of the computation, each of moving objects is caused to pass over or collide with other objects or obstacles in the obliquely displayed picture.

BRIEF DESCRIPTION OF THE DRAWINGS

FIG. 17 is a flow chart illustrating a control for determining whether a moving object passes over or collides with a target;

FIG. 33 is a circuit diagram showing a selector for selecting various video signals according to their priorities; and FIG. 34 is a circuit diagram showing a character display and a moving object display.

DETAILED DESCRIPTION OF THE PREFERRED EMBODIMENTS

Figure 1:
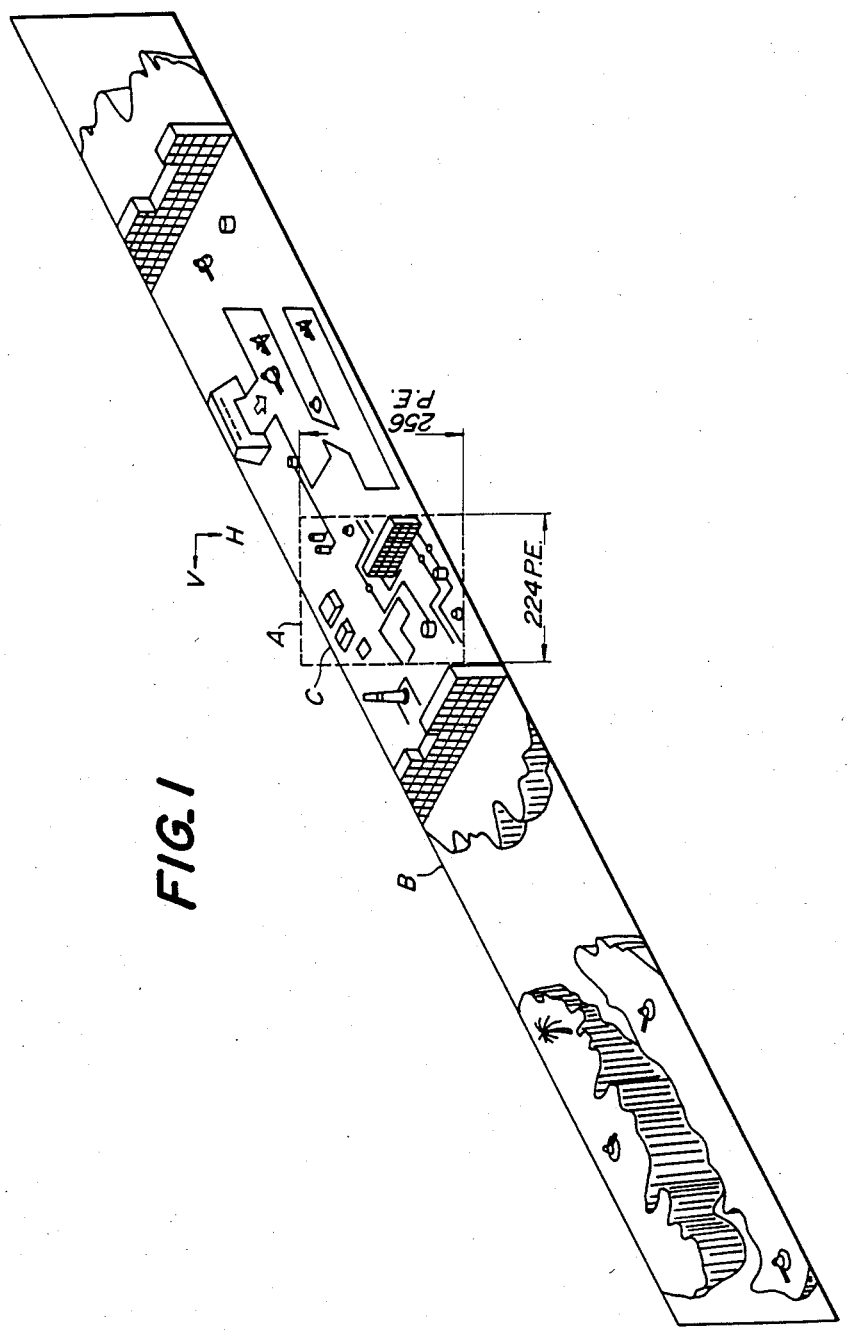
FIG. 1 is a view used to explain an example of video information used in the present invention.

The same reference numerals are used to designate similar parts throughout the figures.

According to the present invention, in order to transform a three-dimensional scene, each of objects which can be designated three-dimensionally by a frame of reference with three orthogonal axes X, Y and Z, into a two-dimensional perspective picture which appears dynamic and realistic, the three-dimensional perspective view is portrayed and moved obliquely with respect to a picture frame or window. Therefore, a long strip of picture seems to be a view as if it were being obliquely scrolled and rolled around a roller, and such a display system as described above will be referred to as "the oblique scrolling" in this specification.

Referring to FIG. 1, there is illustrated a relatively long strip of picture information B, having a rectangular portion enclosed by broken lines A. That is, a window, is displayed on a screen so that the picture information, such as a background scene as shown, is continuously scrolled through the window and consequently the impression of a displayed view is dynamically and realistically enhanced.

Figure 2:
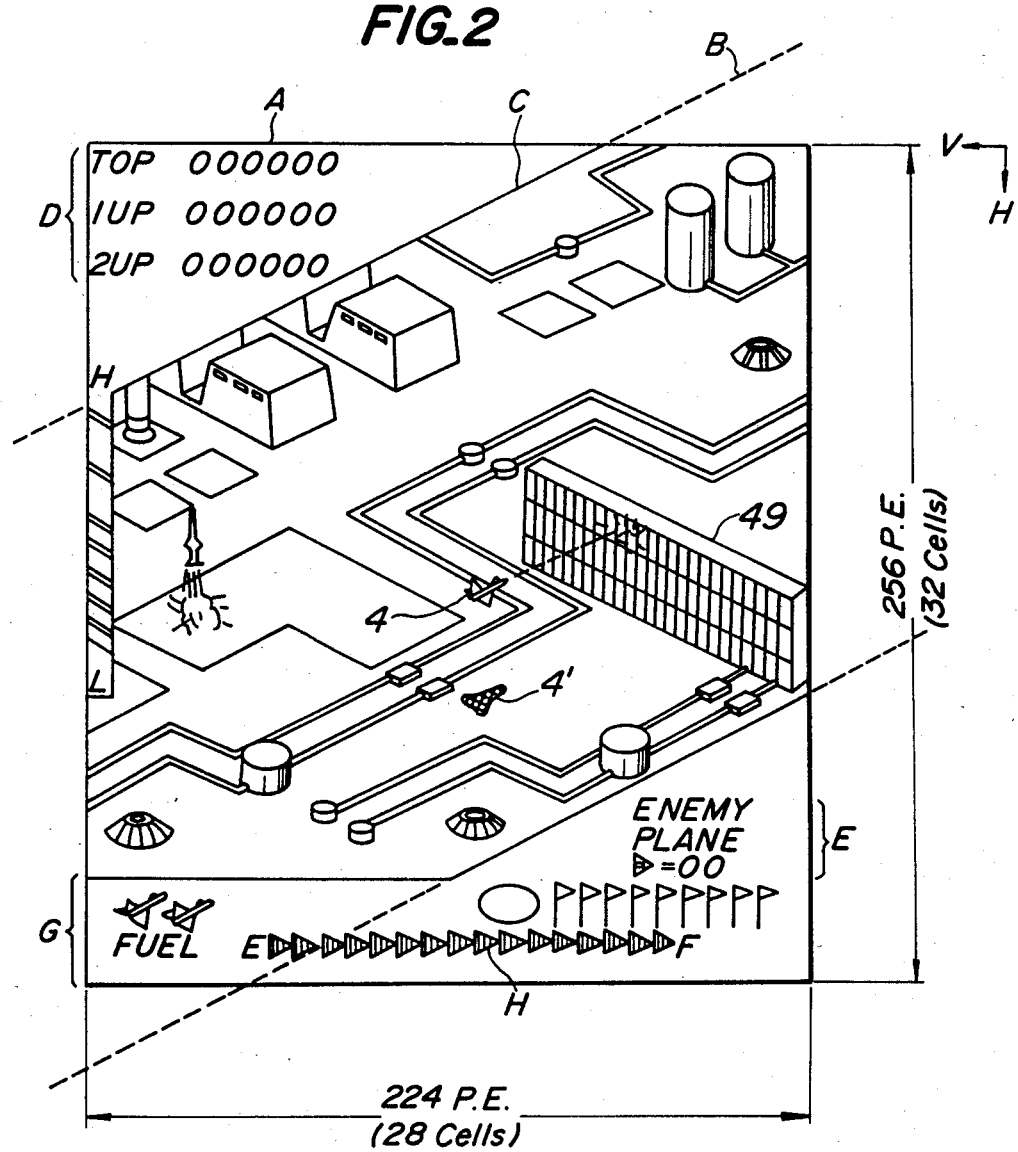
FIG. 2 is a partial view thereof on an enlarged scale.

Such a dynamic and realistic view as viewed through the window A is shown, on an enlarged scale, in FIG. 2. The view seen through the window or the displayed picture A consists of an array of 224 columns (in the horizontal scanning direction H), each consisting of 256 picture elements and 224 rows (in the vertical scanning direction V) each consisting of 224 picture elements; that is, the displayed picture A consists of an array of 224×256 picture elements. Sixteen picture elements on each side of the window A in the direction V are assigned for vertical blanking.

Figure 3:
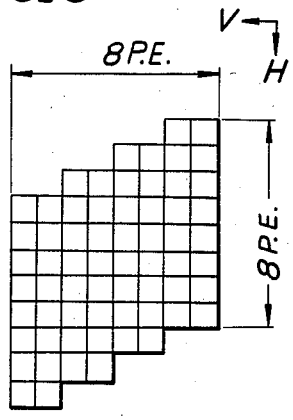
FIG. 3 is a view used to explain a cell of a picture to be displayed in accordance with the present invention.
Figure 4:
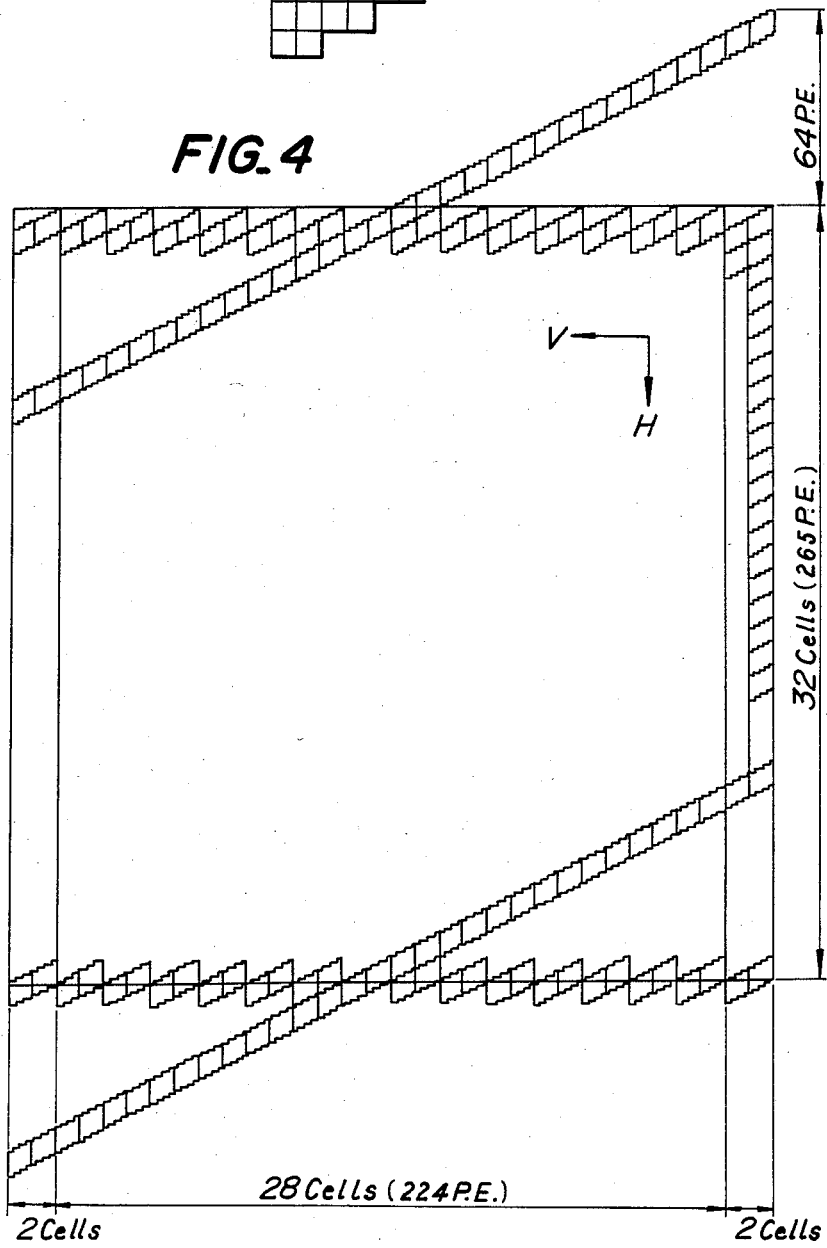
FIG. 4 is a view used to explain a picture displayed in accordance with the present invention.

As shown in FIG. 3, according to the present invention, an array of 8×8 picture elements which are arranged stepwise in an obliquely upward direction constitutes a cell. It follows therefore that the displayed picture A consists of an array of 32 (in the direction H) ×28 (in the direction V) cells.

As described above, the background C is displayed through the window A in the form of a picture moving obliquely downwardly so that the portions exterior of the displayed background C can be utilized to display various data required for an operator and player. For instance referring back to FIG. 2, the upper triangle blank portion D is used to display the scores attained by one or more players, while the lower triangle blank portion may be used to display a number of enemy airplanes which have not yet been destroyed or which must be destroyed before the game is over as indicated by E. In addition, the number of rounds of the game F, the number of friendly aircraft still remaining G, and the remaining energy in terms of per cent (from 100 to 0%) H (between E and F) may be displayed. A graduated scale L-H on the left side of the displayed picture A shows the altitude of aircraft, with L being the ground level and H the maximum or highest altitude that aircraft can climb.

Next referring to FIG. 5, one embodiment of electronic circuitry in accordance with the present invention for effecting the obliquely scrolling dynamic picture display will be described in detail. A remote control unit generally indicated by the reference numeral 1 and operated by a player has a control stick switch 2 and a firing button 3. By operating the stick switch 2, one can steer a moving object, that is, a fighter 4 as shown in FIG. 2 in the six possible directions, that is, horizontally forwardly and backwardly, vertically upwardly and downwardly, and obliquely upwardly and downwardly as indicated by six equi-angularly spaced, radially outwardly extended arrows on the remote control unit 1. The output signals PS from the remote control unit 1 are applied to a microprocessor 5 which is controlled in response to a predetermined game program stored in a program memory 6 and other control programs for controlling other circuits. A sync signal generator 7 generates clock pulses PCLK which in turn are applied to the microprocessor 5. In addition, the sync signal generator 7 generates clocks signals CLK to be applied to a character display 8, an object display 9, a parallel-to-serial converter 10 and a delay circuit 11; load signals LD1 and LD2 for timing the write operations; clock signals ½H and ¼H; horizontal sync counting signals HCT; vertical sync counting signals VCT; and composite sync signal SCYNC.

During a vertical blanking period, and in response to a write signal WS, the contents in a position reference latch 12, that is, object position data transmitted from the microprocessor 5 on a data bus DB, are changed successively so that data for designating the position of one still picture frame of the background B to be displayed during each vertical blanking period are stored in the position reference latch 12. The contents in the position reference latch 12 may be refreshed once during each vertical blanking period or a plurality of vertical blanking periods. Therefore the displayed picture A is time sequentially and obliquely scrolled along the strip of background scene B once during one or more vertical blanking periods so that the picture A is displayed as if the background scene were continuously moving.

According to the present invention, because of the oblique display described above, the vertical and horizontal counts are offset in response to time. That is, the vertical counts VCT from the sync signal generator 7 and the position data from the latch 12 are applied to a vertical adder 13 so that VCT data is offset in time by a period corresponding to the position data stored in the latch 12, whereby an offset vertical sync count OVCT is obtained. The offset vertical sync count OVCT is applied, as data representative of a read out address in the vertical direction, to a background map programmable ROM (read-only memory) 14 in which is stored the information of the entire background scene as units each consisting of 8 picture elements in the horizontal direction of each cell (see FIG. 3). The horizontal and vertical sync counts HCT and VCT are applied to a horizontal adder 15 so that the HCT data is offset in time by a period corresponding to data obtained by multiplying VCT data by a constant. The value of the constant represents a displacement per unit time in the horizontal and vertical directions, that is, an angle between the horizontal and the direction in which the displayed picture A is obliquely downwardly scrolled. The offset horizontal sync count from the horizontal adder 15 is applied to a constant adder 16 which functions as a horizontal position adjusting unit so that the whole picture frame of the background B displayed through the window A is shifted in the horizontal direction H by a predetermined distance or constant (for instance, by 32 or 64 picture elements). Data or offset horizontal sync count OHCT obtained from the constant adder 16 is applied to PROM 14 so as to designate a horizontal address to be read out from the program stored therein.

Figure 6:
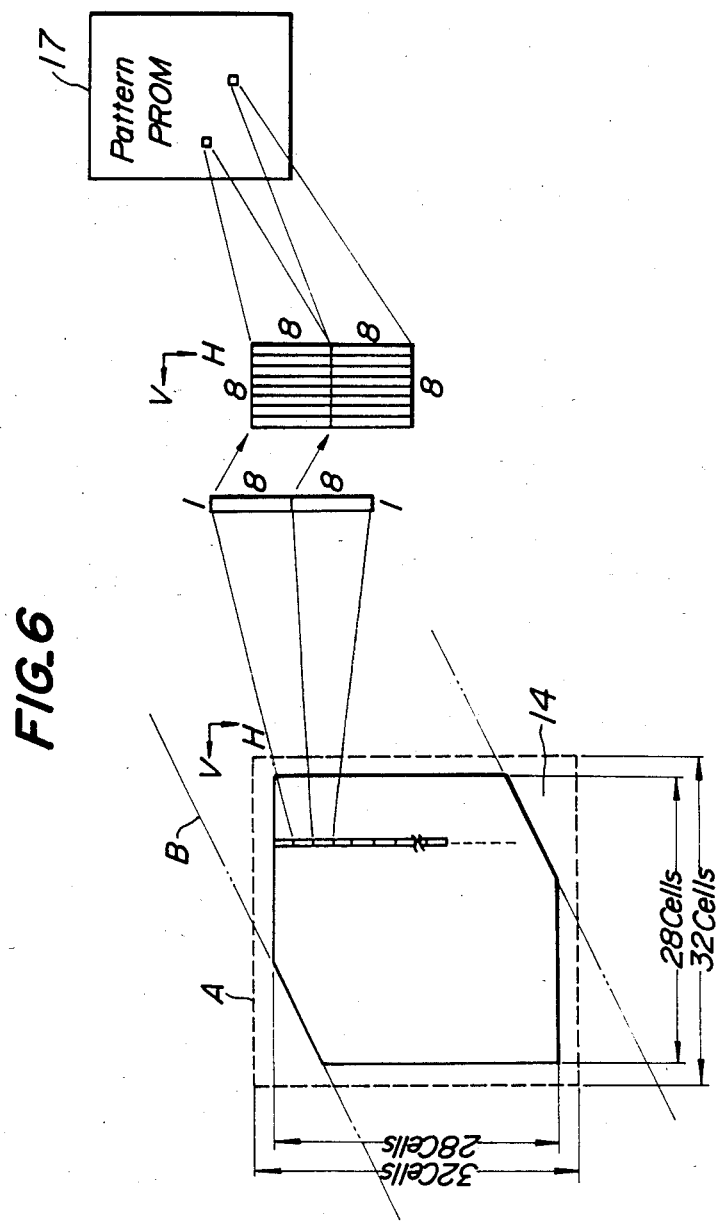
FIG. 6 is a view used to explain a memory therein.

The program stored in the PROM 14 is accessed by the thus obtained vertical and horizontal address instructions OVCT and OHCT so that the stored data for each cell are sequentially accessed and read out during a vertical scanning period. The thus read out data, that is, data representative of a horizontal array of 8 picture elements as shown in FIG. 6, is used to access a pattern programmable ROM 17.

The information of the entire background B (see FIG. 1) is divided into image forming or construction units, each consisting of a horizontal array of 8 picture elements and the thus obtained image construction units, are stored in the pattern PROM 17. In other words, the entire background scene B can be portrayed by combining various image construction units. Therefore, the background map PROM 14 stores address instructions or the data for accessing the PROM 17, that is, the codes for specifying the image forming units which are stored in the PROM 17 and read out to form a frame of background picture. In response to the load signal LD2, an image forming unit, that is, an array of 8 picture elements, is read out of the PROM 17 and stored temporarily in a latch 18. Three lower significant bits of the offset vertical sync count OVCT are applied from the vertical adder 13 to the pattern PROM 17 so that one of the eight horizontal scanning lines in the vertical direction V in each cell is selected to specify the position of the read out image forming unit. The load signal LD2 is generated 32 times during each horizontal scanning period.

In response to the load signal MLD from the delay circuit 11, data or image construction units stored in the latch 18 are transferred in parallel into a parallel-to-serial converter 10 which is an 8-bit shift register. The parallel data or image construction units transferred in parallel into the parallel-to-serial converter 10 are time sequentially read out one at a time in synchronism with the horizontal scanning, whereby background video signals BVS are obtained. That is, the background video signals BVS are serially read out from the parallel-to-serial converter 10 in the order corresponding to the sequential order of scanning lines or in the order of horizontal scanning lines extended through sequentially arrayed cells. Thus read out background video signal BVS include those corresponding to the upper and lower triangle blank portions D-H outside the background scene or image C shown in FIG. 2.

The background video signals BVS, the character video signals CVS from the character display 8 and the moving object video signals MVS from the moving object display 9 are applied to a priority processing unit 19, where priorities are assigned in the order of the video signals CVS, MVS and BVS and read out as the display video signals DVS in the order of their priorities so as to be applied to a video display 20 to which is also applied the composite sync signals CSYNC from the sync signal generator 7. Thus the background scene, the moving object or fighter 4 and the character data are displayed as shown in FIG. 2. Thus one still picture can be displayed during each vertical scanning time and, in response to the output signal PS from the remote control 1, still pictures are sequentially displayed in the manner described above under the control of the microprocessor 5.

Write enable signal WE, vertical and horizontal sync counts VCT and HCT, clock pulses CLK, ½H and ¼H are applied to both the character display 8 and the moving object display 9. Character display address signal CAD and character data from the microprocessor 5 are applied to the character display 8, the character data being transmitted through the data bus DB. Moving object address signal MAD and moving object data from the microprocessor 5 are applied to the moving object display 9, the moving object data being also transmitted through the data bus DB.

Figure 7:
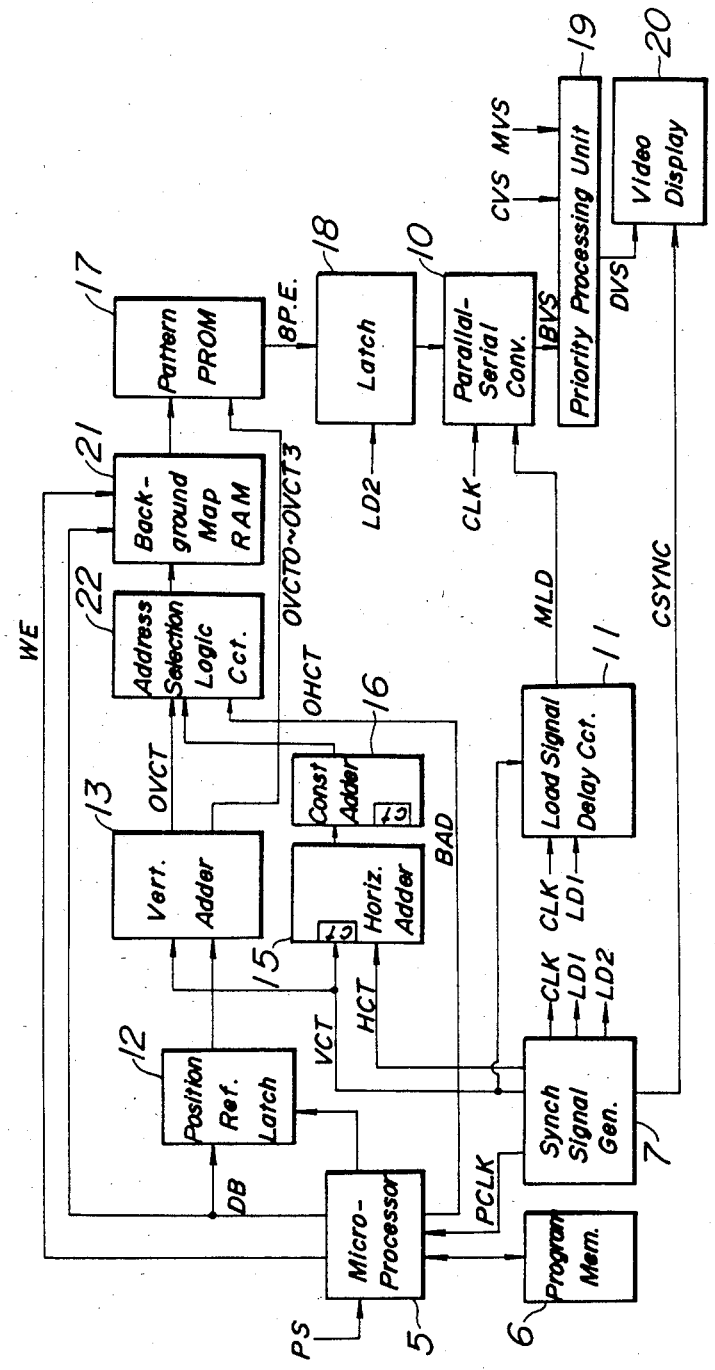
FIG. 7 is a block diagram showing a second embodiment of electronic circuitry in accordance with the present invention.

In FIG. 7 is shown the block diagram of a second embodiment of the present invention for effecting the dynamic and oblique scrolling display. The second embodiment is substantially similar in construction to the first embodiment described above except that instead of the background map programmable ROM 14 of the first embodiment, a background map random access memory RAM 21 is used and a RAM address selection logic 22 is interconnected between the background map RAM 21 on the one hand and the vertical adder 13, the constant adder 16 and the microprocessor 5 on the other hand. Since the background map RAM 21 is used, the background viewed through the window can be varied under the control of the microprocessor 5. The output OVCT from the vertical adder 13, the output OHCT from the constant adder 16 and the output BAD from the microprocessor 5 are applied to the RAM address selection logic 22 so that one of these three signals is selected and applied to RAM 21. That is, during the vertical and horizontal blanking periods, the address signal BAD is applied to the RAM 21 so that in response to the write enable signal WE, the background data transmitted from the microprocessor 5 through the data bus DB is transferred into the background map RAM 21. Except the vertical and horizontal blanking periods, data specified by the offset vertical and horizontal sync counts OVCT and OHCT, is read out from the RAM 21 so as to access the pattern PROM 17.

Pattern selection codes for each cell are stored in the background RAM 21 in a manner substantially similar to that described in conjunction with the first embodiment. For each vertical scanning, these codes are sequentially, obliquely shifted and when they exceed the region or area for displaying 28 cells in the vertical direction, that is, when the vertical blanking period is just started, the codes in respective cells are refreshed so that the next background scene can be displayed. The processing of the image construction units, each consisting of 8 picture elements, after they have been read out from the pattern ROM 17 is substantially similar to that described above with reference to the first embodiment so that no further explanation shall be made in this specification.

When use is made of the RAM 21, the microprocessor 5 portrays the pictures so that it is required on the side of the microprocessor 5 to have a ROM for storing the picture information program. Therefore, the capacity of the ROM of the second embodiment is the same as that of the first embodiment, but the second embodiment is more advantageous in flexibility than the first embodiment, because in the second embodiment, exterior or peripheral memories, such as cassette tape recorders or floppy disk systems, can be used as the memory 6.

As described above, according to the present invention, the displayed picture can be scrolled obliquely so that it appears to be very realistic. In addition, in order to enhance more realistic image display, the following operations can be carried out:

(1) A moving object can be arbitrarily moved in the X, Y and Z directions;

(2) A moving object can be projected over the background scene, that is, the shadow of a moving object can be cast over the background scene;

(3) A moving object can be enlarged or reduced in scale so that the depth of view can be enhanced;

(4) It can be determined whether in a three-dimensional space a moving object overlaps with another object or it can pass over another object; and (5) If a background scene such as space has no reference objects which make the background scene look perspective, markers can be displayed so that the background scene looks realistic or perspective.

The above-described operations will be explained in more detail below.

(1) Range of Moving Objects

Figure 8:
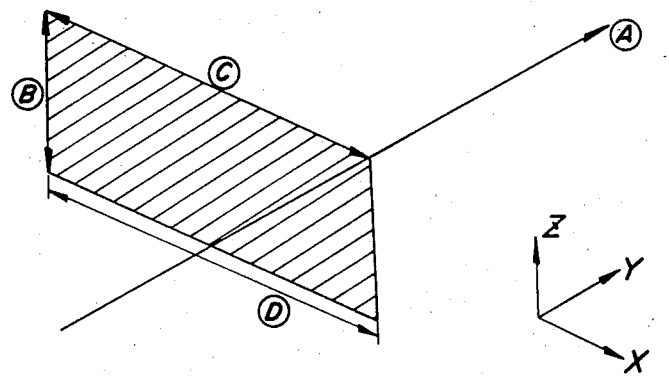
FIG. 8 is a view used to explain the movable range of a moving object.

In order to enhance the realistic and dynamic representation of a three-dimensional moving object such as the fighter 4 as shown in FIG. 2, it is displayed as being viewed from a position located obliquely, backwardly and upwardly of the moving object so that the moving object can move in a hatched parallelogram which is bounded by vertical sides Ⓑ and slanting upper and lower sides Ⓒ as shown in FIG. 8. The movable region makes an angle with respect to the direction of movement indicated by arrow Ⓐ of the moving object, that is, the direction opposite to the direction in which the displayed picture is obliquely scrolled. Vertical side Ⓑ indicates the range in which the moving object can move upwardly or downwardly and is parallel to the Z-axis and side Ⓒ indicates the range in which the moving object can move transversely and is parallel to the X-axis. Direction Ⓐ is in parallel with the Y-axis.

(2) Projection of Moving Objects

In order to more distinctly point out the position of the moving object with respect to the background scene, the shadow 4' of the moving object is cast on the background scene as shown in FIG. 2. The shadow 4' can move within the range indicated by Ⓓ in FIG. 8. Therefore, the distance between the moving object 4 and its shadow 4' can simulate the altitude of the moving object with respect to the ground.

Figure 9:
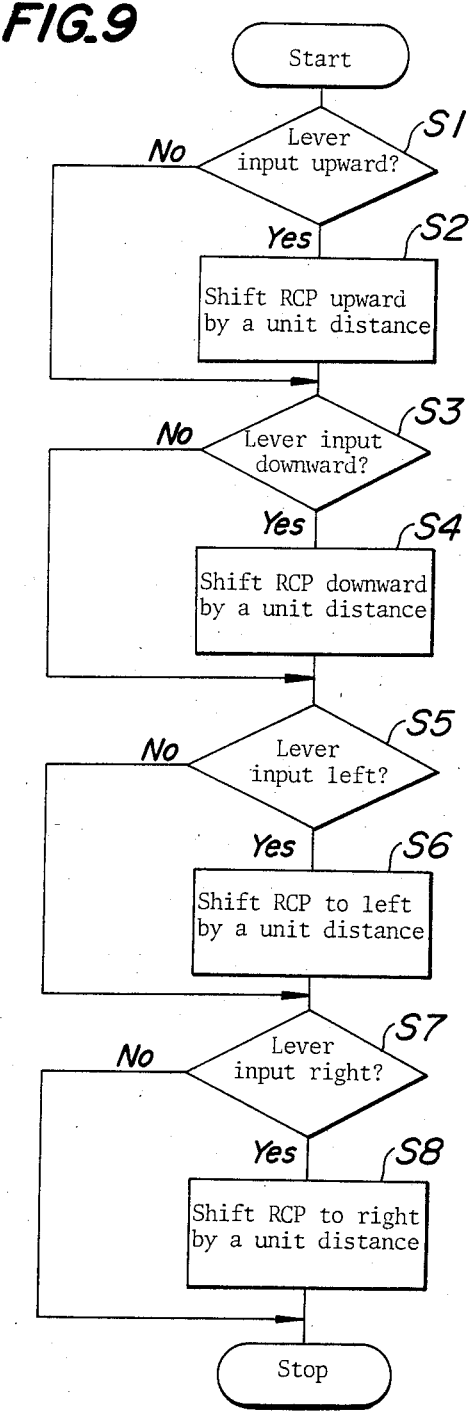
FIG. 9 is a flow chart illustrating a control of the movement of a moving objects.

In response to the output from the remote control unit 1, that is, in response to the operation of the control stick switch 2, the microprocessor 5 establishes the positional relationship between the moving object 4 and its shadow 4' in accordance with a flow chart as shown in FIG. 9, whereby the object display 9 forms the shadow 4'. In the first step S1, whether the lever input, that is, the signal representative of the direction of the movement of the control stick switch 2, is upward or not is determined. In the case of the "upward" lever input, the second step S2 causes the moving object or a remote-controlled aircraft (RCA) 4 is moved upward by a predetermined unit distance. In this case, the shadow 4' of the moving object 4 remains unchanged in position and since the moving object 4 is moving away from its shadow 4', it seems that the remote-controlled aircraft 4 were climbing. In the third step S3, whether the lever input is downward or not is determined. In the case of the "downward" lever input, the remote-controlled aircraft 4 is moved downward by a predetermined unit distance with respect to its shadow 4' which remains also unchanged in position. Therefore, the distance between the moving object 4 and its shadow 4' is reduced so that it seems that the remote-controlled aircraft 4 were descending. In step S5, whether the lever input is left or not is determined. In the case of the "left" lever input, step S6 causes the remote-controlled aircraft 4 to move leftwards by a predetermined unit distance while causing the shadow 4' to move upward and leftwards. In this case, the distance between the remote-controlled aircraft 4 and its shadow 4' remains unchanged so that the altitude of the remote-controlled aircraft 4 remains unchanged. In like manner, in step S7 whether the lever input is rightwards or not is determined. In the case of the "rightwards" lever input, step S8 causes the remote-controlled aircraft 4 to move rightwards by a predetermined unit distance while causing the shadow 4' thereof to move downwards and rightwards. Since the distance between the remote-controlled aircraft 4 and its shadow 4' remains unchanged, the altitude of the aircraft 4 can be maintained at the same level.

Figure 10:
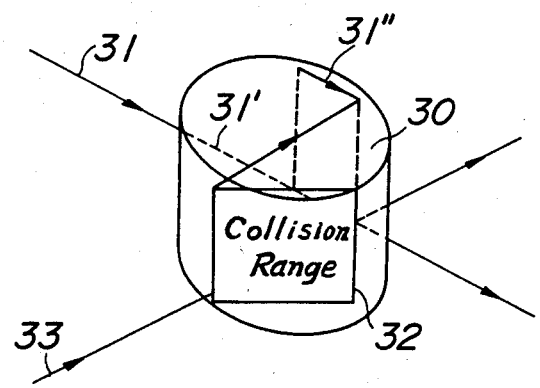
FIG. 10 is a view used to explain the movement and disappearance of the shadow cast by a moving object.

When the shadow 4' is caused to move upwards or downwards or to appear and disappear depending upon the shapes and height of buildings over which the remote-controlled aircraft 4 flies over, the displayed view will become more dynamic and realistic. The operation for moving and hiding the shadow to this end will be described below with reference to FIG. 10.

When the shadow of a moving object is moving horizontally (in the X direction) along the straight line 31, it disappears at the point of contact or intersection between the straight line 31 and the edge of an image 30 of a building and is kept disappeared or hidden while the shadow is passing over the building image 30 along the imaginary or dotted line 31'. However, the shadow reappears at the point of contact or intersection between the dotted line 31' and a predetermined collision region or area 32 on the X-Y airplane. It is assumed that if the moving shadow enters the collision region or area 32, it collides with the building 30. It follows therefore that the shadow reappears on the roof of the building 30 as indicated by 31". When the shadow passes over the collision region or area 32, the shadow on the roof of the building 30 disappears and moves again along the imaginary line 31'. When the shadow passes over the building, that is, at the point of contact or intersection of the shadow line 31 with the other edge of the building 30, the shadow reappears to move along the line 31 in the direction indicated by the arrow.

The attitude of the shadow moving in the direction indicated by the arrow 33, that is, the same direction as the scrolling direction, is substantially similar to that described above. That is, when the shadow collides with the building 30, it disappears and reappears on the top of the building 30 when the shadow enters the collision region or area 32.

(3) Enlargement and Reduction in Scale of Moving Objects

When an moving object is flying in the space wherein its shadow is not formed, the image of the moving object is enlarged or reduced in scale depending upon whether the moving object is ascending or descending so that the picture may be represented more realistically. More particularly, the higher the altitude of the moving or flying object, that is, the closer the moving object is to the viewing position or the eye of a player or operator, the larger the image pattern of the moving object becomes and also the faster the velocity thereof becomes. On the other hand, when the moving object is at a low altitude, the image pattern of the moving object becomes smaller and its velocity becomes lower. In this case, the microprocessor 5 simulates the movement of the moving object in accordance with the flow chart including four steps from S11 to S14 as shown in FIG. 11.

(4) Overlapping of Images of Objects (a) Remote-controlled Aircraft vs. Targets

Figure 11:
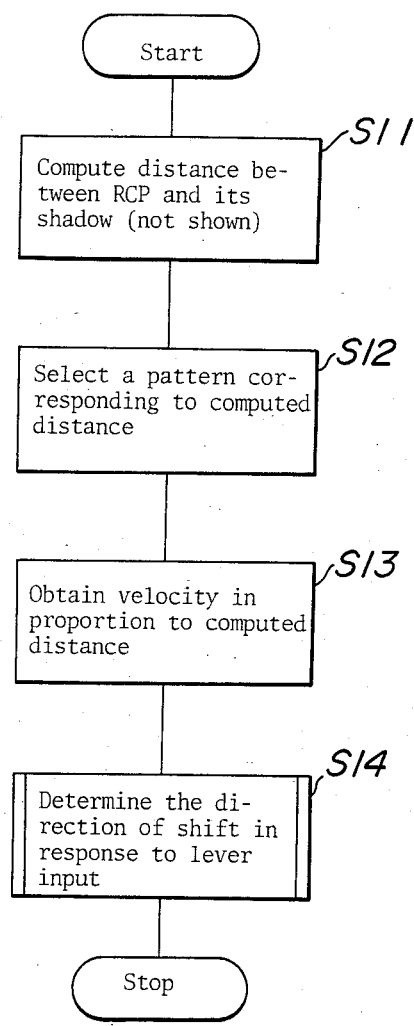
FIG. 11 is a flow chart illustrating a control for simulating the movement of a moving object.
Figure 12:
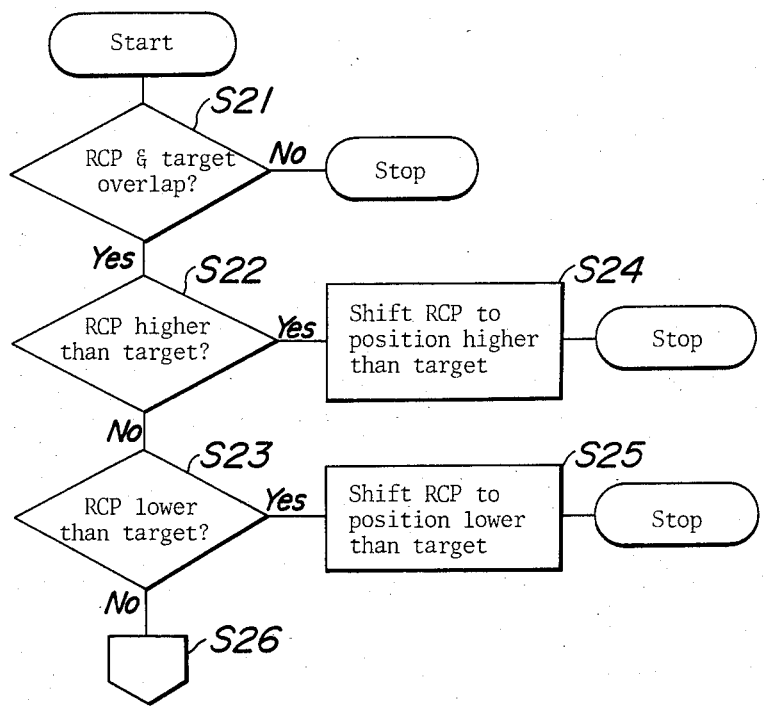
FIG. 12 is a flow chart illustrating a control of a moving object with respect to a target.

The microprocessor processes the steps from S11 to S14 of the flow chart as shown in FIG. 11 in order to attain the passing effects and subsequently enhance the more realistic representation because the overlapping of the images of a moving object and another object, such as a target, does not necessarily mean that the moving object and the target collide with each other in the three-dimensional space. More particularly, if the altitudes of the moving object and target are different in the three-dimensional space, they do not collide but pass each other, even though their projections overlap each other on an imaginary screen.

Figure 13A:
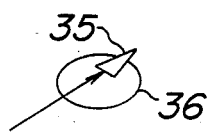
FIGS. 13A, 13B 14, 15A, 15B and 16A, 16B are views used to explain the conditions whether a moving object passes over or collides with a target.
Figure 13B:
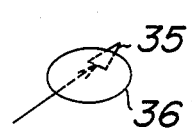

The passing effect simulation will be described in detail with reference to FIG. 13, in which (A) shows that a flying object or remote-controlled aircraft 35 is flying above a target 36 while (B) shows that the remote-controlled aircraft 35 is passing under the target 36.

Figure 14:
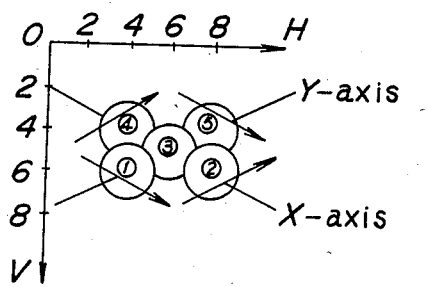

The passing effect simulation will be further explained with reference to FIG. 14 when the altitude of the remote-controlled aircraft is the same as the height of the target. In this case, the effects due to the thickness of the remote-controlled aircraft and the target are taken into consideration. It is assumed that when the remote-controlled aircraft passes over the target ③ as indicated by ① or ② the aircraft moves forward, but when the remote-controlled aircraft passes over the target ③ in the direction indicated by ④ or ⑤, the aircraft passes backward. Furthermore, it is assumed that when the remote-controlled aircraft overlaps with the target ③ they collide with each other.

Figure 15A:
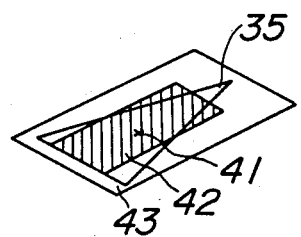
Figure 15B:
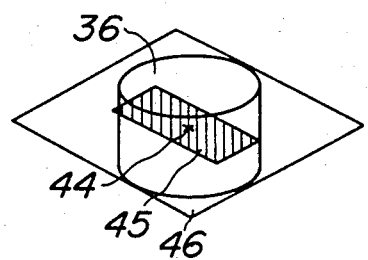

The overlapping relations between the remote-controlled aircraft and the target are defined as shown in FIGS. 15A and 15B. Reference numeral 35 denotes a remote-controlled aircraft with the center 41; 42, a collision range or area; and 43, a passing range or area. In the case of a target 36, its center is denoted by 44; the collision range or area, by 45; and the passing range or area, by 46. Collision between the aircraft 35 and the target 36 does not occur merely when their images overlap each other, and when and only when their collision ranges or areas 42 and 45 overlap each other, the collision occurs.

Figure 16A:
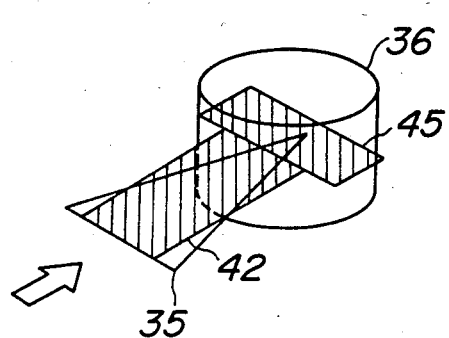
Figure 16B:
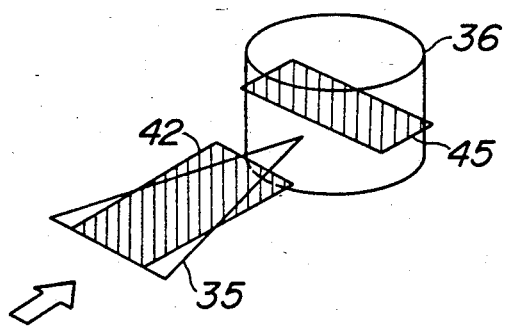

For instance, when their collision ranges or areas overlap each other as shown in FIG. 16A, it is assumed that the remote-controlled aircraft 35 collides against the target 36. However, no collision occurs even when the remote-controlled aircraft 35 strikes against the target 36 as shown in FIG. 16B.

The microprocessor 5 executes the control of the steps from S31 to S41 of the flow chart as shown in FIG. 17 so as to make the decision whether the remote-controlled aircraft collides with or passes over the target.

(b) Remote-Controlled Aircraft vs. Upstanding Walls

Figure 18:
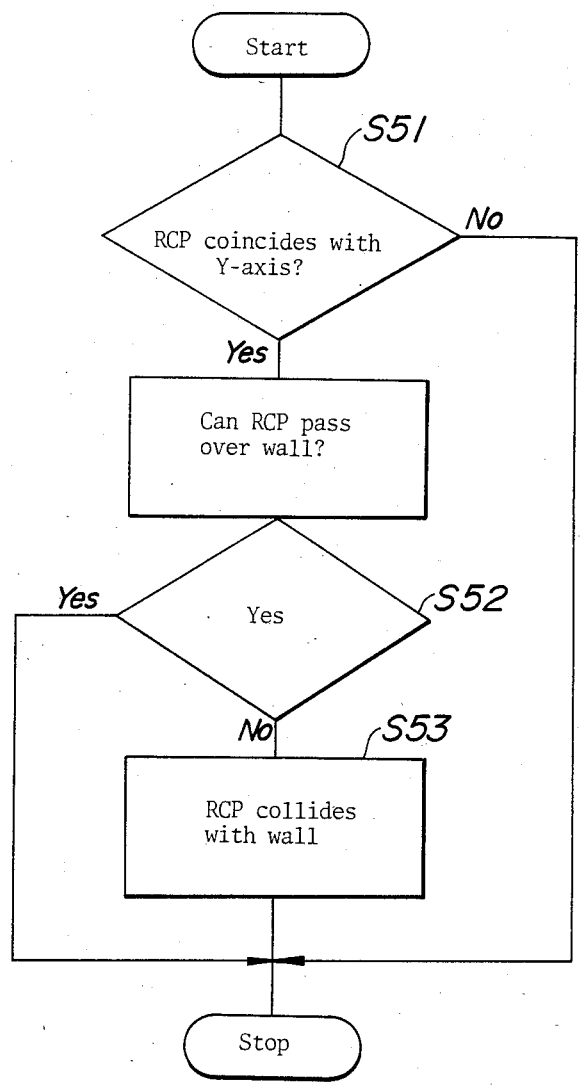
FIG. 18 is a flow chart illustrating a control for determining whether a moving object passes over or collides with a wall.

In order to further enhance the realistic representation, collision of, for instance, the remote-controlled aircraft 4 against the upstanding wall 49 as shown in FIG. 2 must be taken into consideration and subsequently simulated. According to the present invention, the microprocessor 5 executes the control of the sequential steps from S51 to S53 of the flow chart as shown in FIG. 18 to simulate such collision.

(c) Missiles Fired from Remote-Controlled Aircraft vs. Walls

Figure 19:
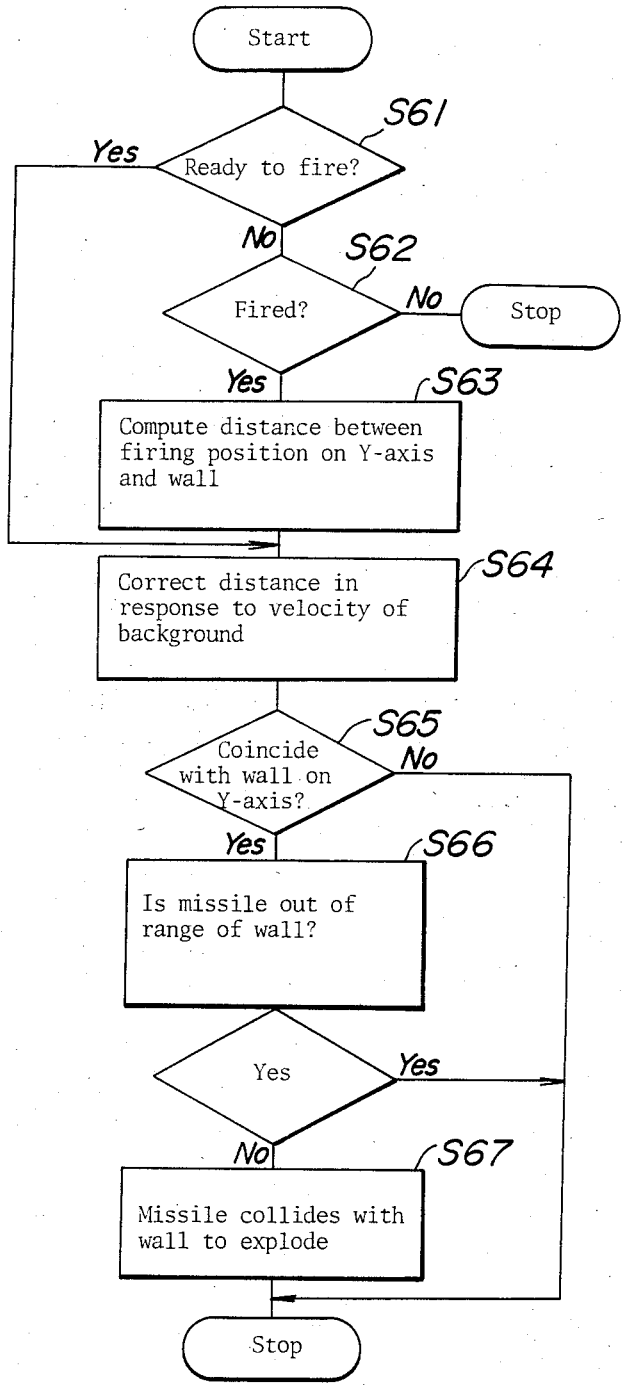
FIG. 19 is a flow chart illustrating a control for determining whether or not a missile fired from a friendly airplane hits a target.

As shown in FIG. 2, if a missile, bullets or the like fired from the remote-controlled aircraft 4 successfully strikes against the wall 49, the explosion must be simulated so that the distance between the remote-controlled aircraft 4 and the wall 49 may be more realistically represented. Therefore, the microprocessor 5 carries out the control of the steps from S61 to S67 of the flow chart as shown in FIG. 19.

(5) Display of Markers

Figure 20:
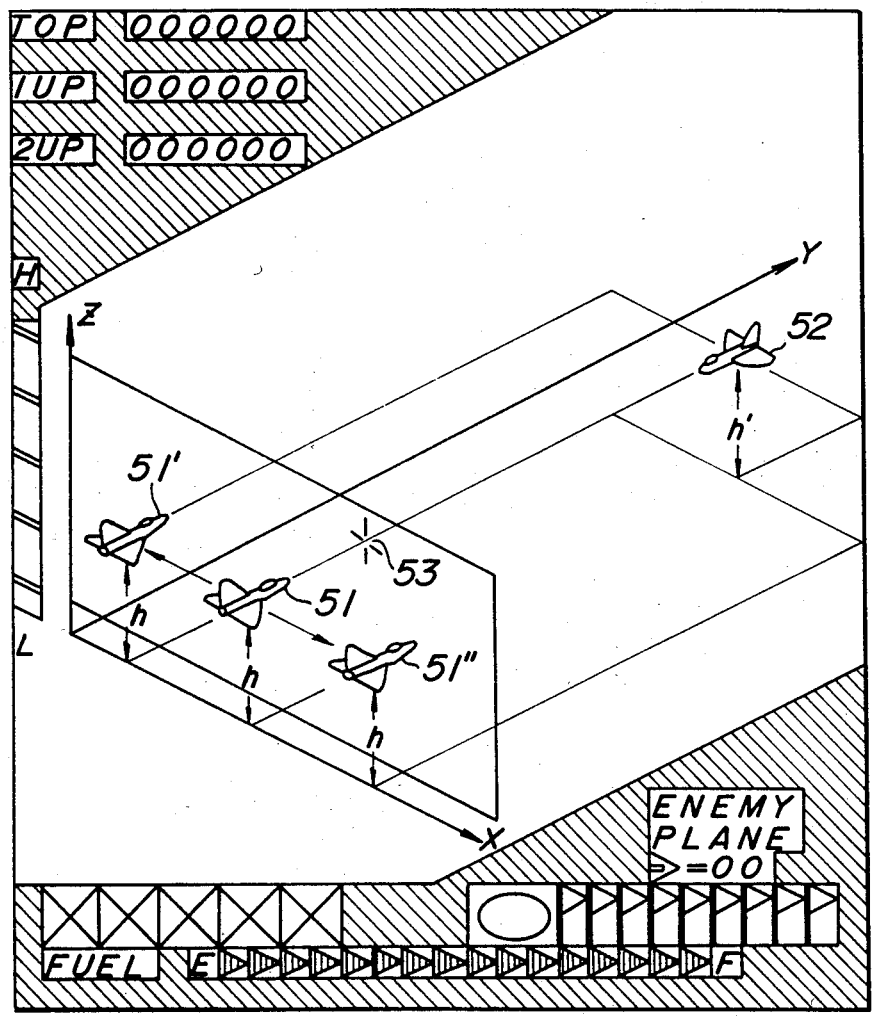
FIG. 20 is view used to explain the display of a frame of reference with respect to a background scene without any reference object.
Figure 21:
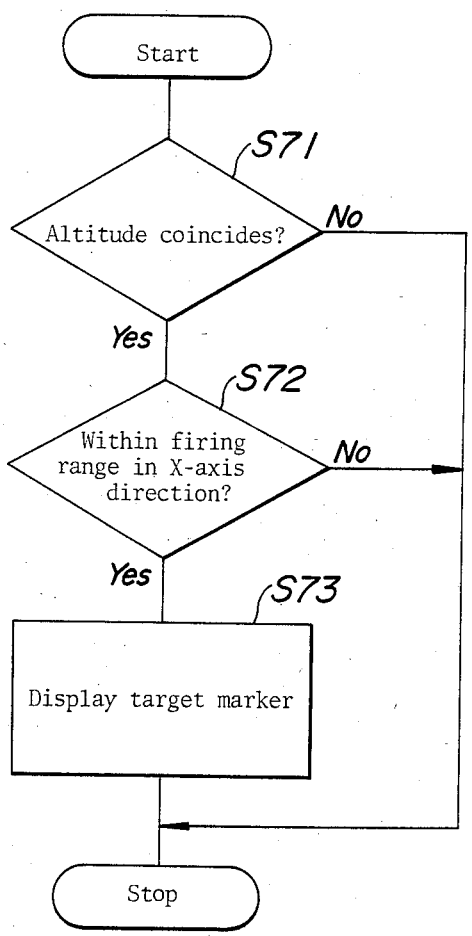
FIG. 21 is a flow chart used to explain the display of a target marker in FIG. 20.

When the background only consists of a flat terrain or space with no object as shown in FIG. 20, the realistic representation becomes impossible, even when the oblique scrolling is effected. In the case of such background, it is only the moving object that is presented to give a perspective view. However, it becomes very difficult for a friendly aircraft 51 to aim at and fire a missile or bullets against an enemy airplane 52, if there does not exist any frame of reference. According to the present invention, therefore, in order to assist the pilot of the fighter 51 in aiming at the enemy airplane 52, a target marker 53 is displayed. To this end, the microprocessor 5 carries out the control of the steps from S71 to S73 of the flow chart as shown in FIG. 21 on the assumption that the altitude h of the friend airplane 51 is the same as that h' of the enemy airplane 52, that the other remote-controlled airplanes 51' and 52' do not exist in FIG. 20 and that the enemy airplane 52 be within the firing range of the friendly airplane 51 which may be represented by the X and Z cordinates.

Figure 22A:
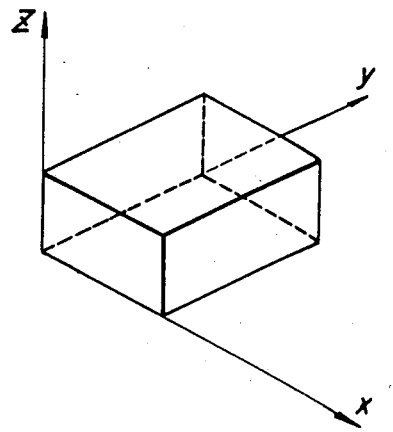
FIGS. 22A, 22B and 23 are views used to explain the projection methods used in the present invention.
Figure 22B:
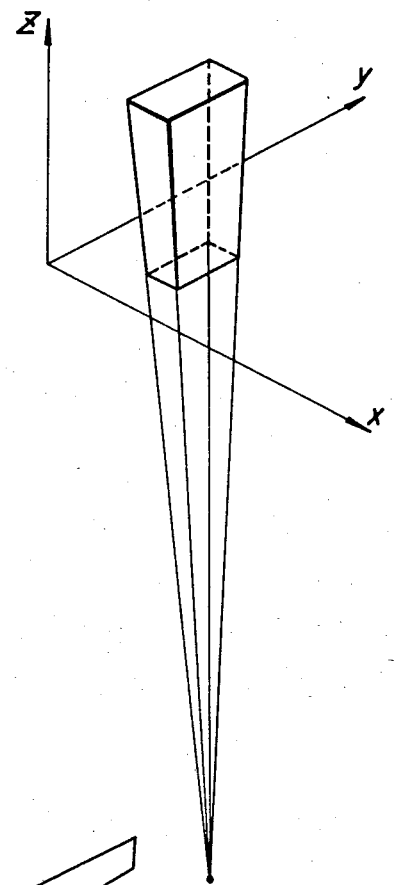
Figure 23:
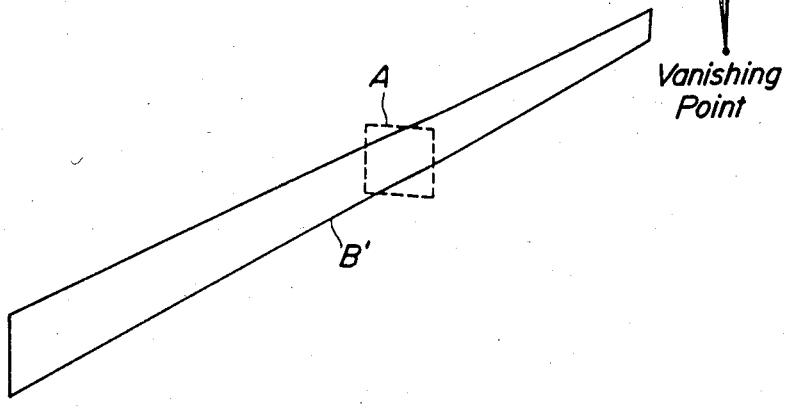

So far the perspective view displayed in accordance with the present invention has been described as being displayed based upon a projection method in which the vanishing point of the reference axes X, Y and Z in the three-dimensional space is infinite as shown in FIG. 22A. However, when it is desired to display a view which is enlarged in the direction Z, the projection method as shown in FIG. 22A cannot be used, because it can not be approximated that the vanishing point in the Z direction be at infinite distance. In this case, a projection method as shown in FIG. 22B may be used in which the vanishing point exists only in the Z-direction. Alternatively, as shown in FIG. 23, the whole background view B' may be displayed in perspective with respect to the screen or window A. In other words, the vanishing point may be located in the Y direction.

Figure 5:
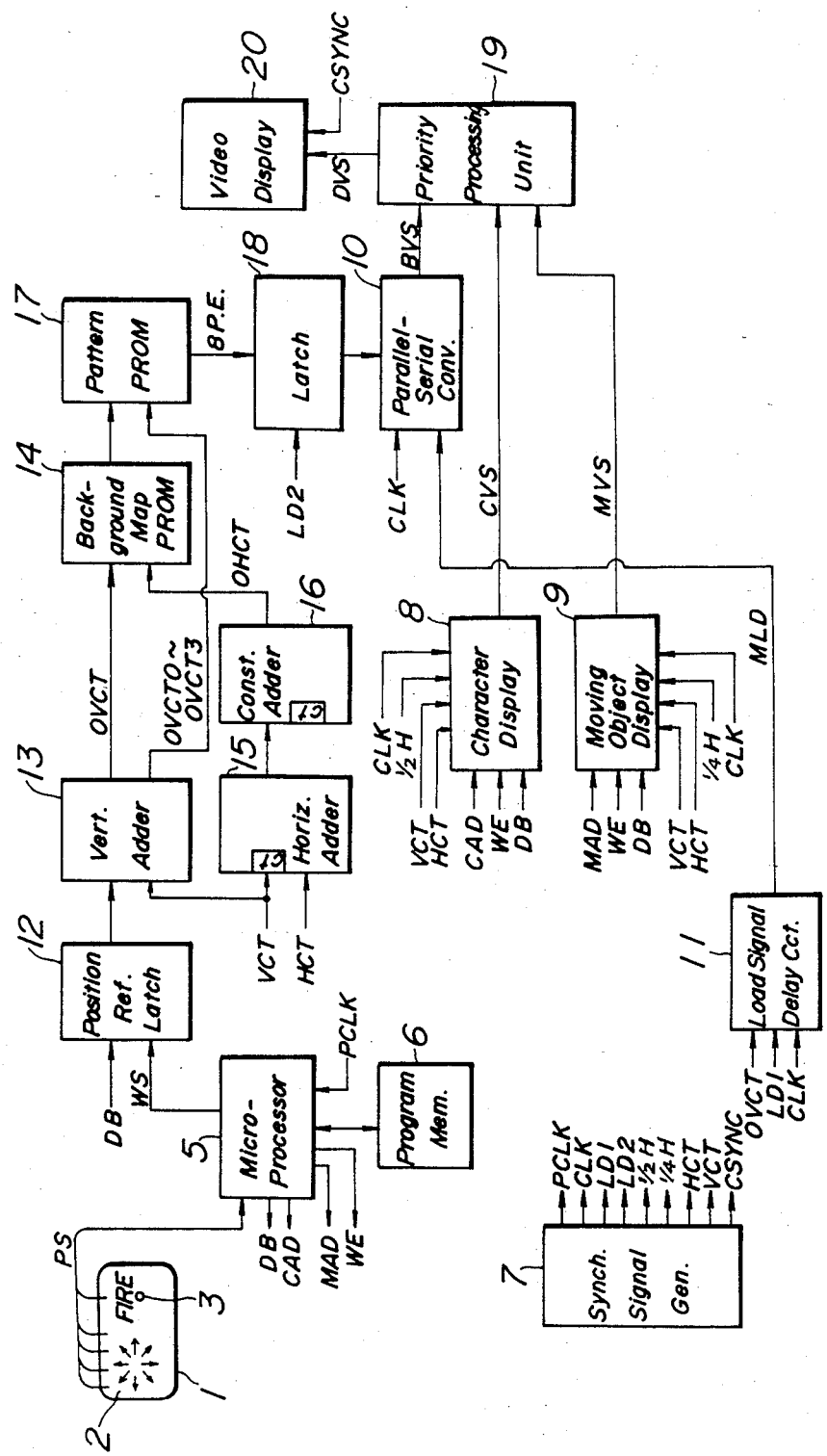
FIG. 5 is a block diagram showing a first embodiment of electronic circuitry in accordance with the present invention.

Next referring to FIGS. 24 through 33, the components of the block diagram as shown in FIG. 5 will be described in more detail below.

Figure 24:
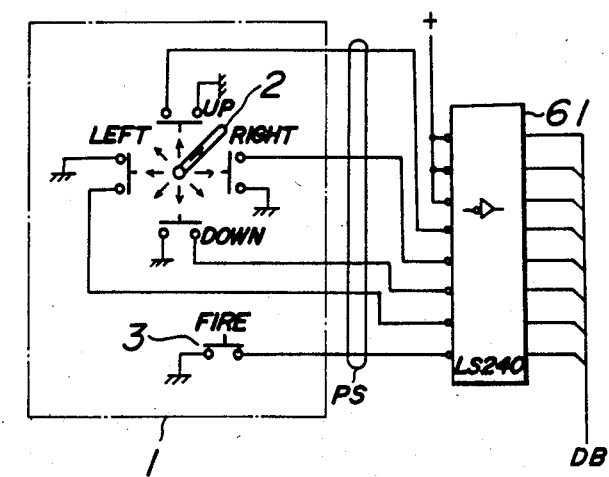
FIG. 24 is a circuit diagram showing a control unit.

As shown in FIG. 24, the play signals PS generated by a player by operating the switch 2 and the firing button 3 on the control unit 1 are transferred onto the data bus DB through a buffer and driver 61 (for instance, LS240, the product of Texas Instruments).

Figure 25:
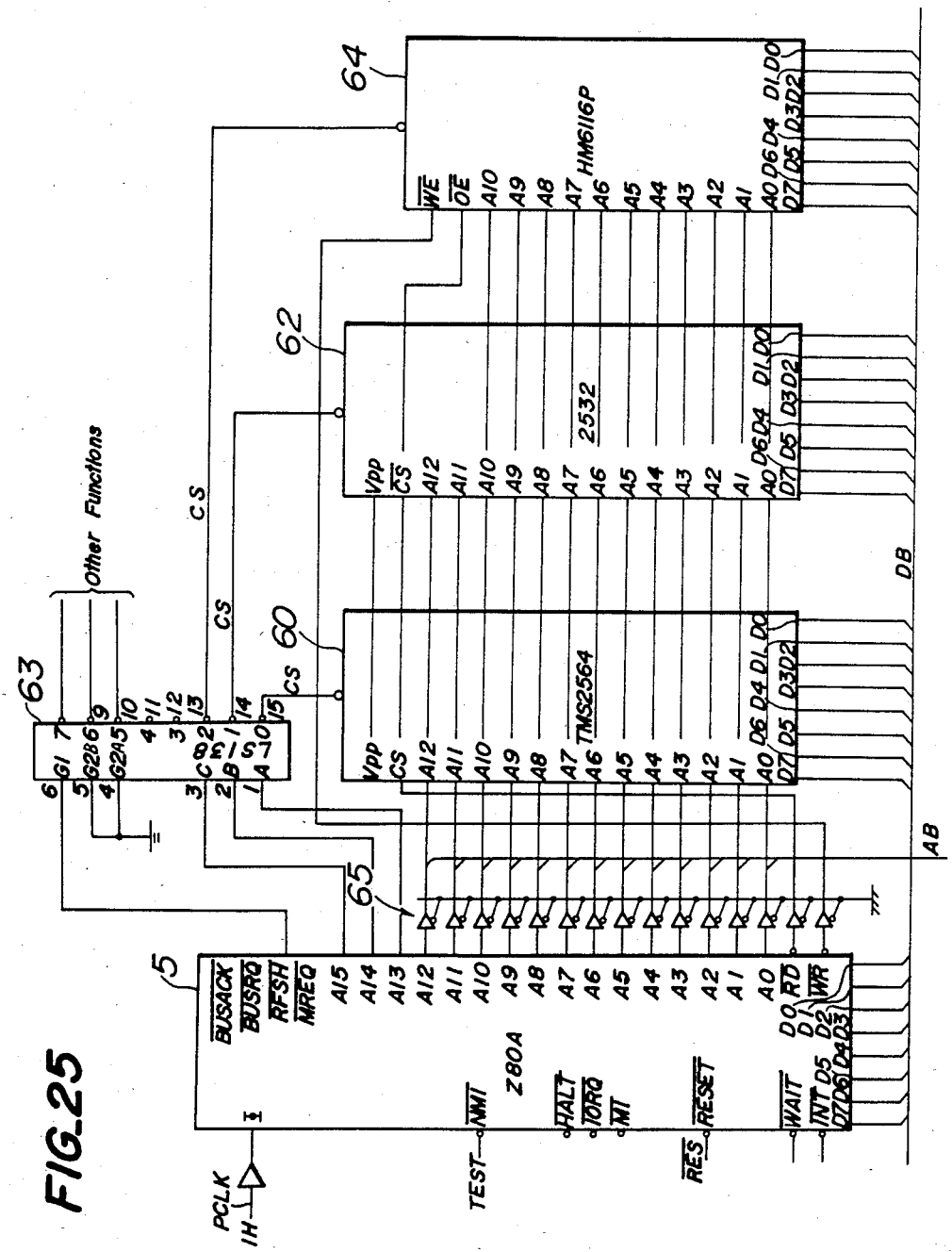
FIG. 25 is a circuit diagram showing a microprocessor.

The microprocessor 5 may be, for instance, a Z80A (the product of NEC) as shown in FIG. 25. Addressing terminals or pins $A_0$-$A_{12}$ and $\overline{RD}$ and $\overline{WR}$ are connected to a buffer and driver 63 (for instance, LS244 X 2, the products of Texas Instruments) so that addressing signals or instructions are transferred onto an addressing bus AB while the read signal $\overline{RD}$ and the write signal $\overline{WR}$ are produced. Addressing signals derived from the addressing terminals or pins $A_0$-$A_{12}$ are applied through a buffer amplifier group 65 to program memories 60 and 62 (for instance, TMS2564 and 2532, the products of Texas Instruments) and a work RAM (for instance, HM6116P, the product of Hitachi). The read signal $\overline{RD}$ is supplied to the program memories 60 and 62 from the microprocessor 5. The read and write signals $\overline{RD}$ and $\overline{WR}$ are supplied to the work RAM 64 from the microprocessor 5. The chip select signal CS is transmitted from the microprocessor 5 to these memories 60, 62 and 64 via a higher order address decoder 63 (for instance, LS138, the product of Texas Instruments). Further, the decoder 63 is also used to generate decoded signals for various functions not directly related to this invention.

Figure 26:
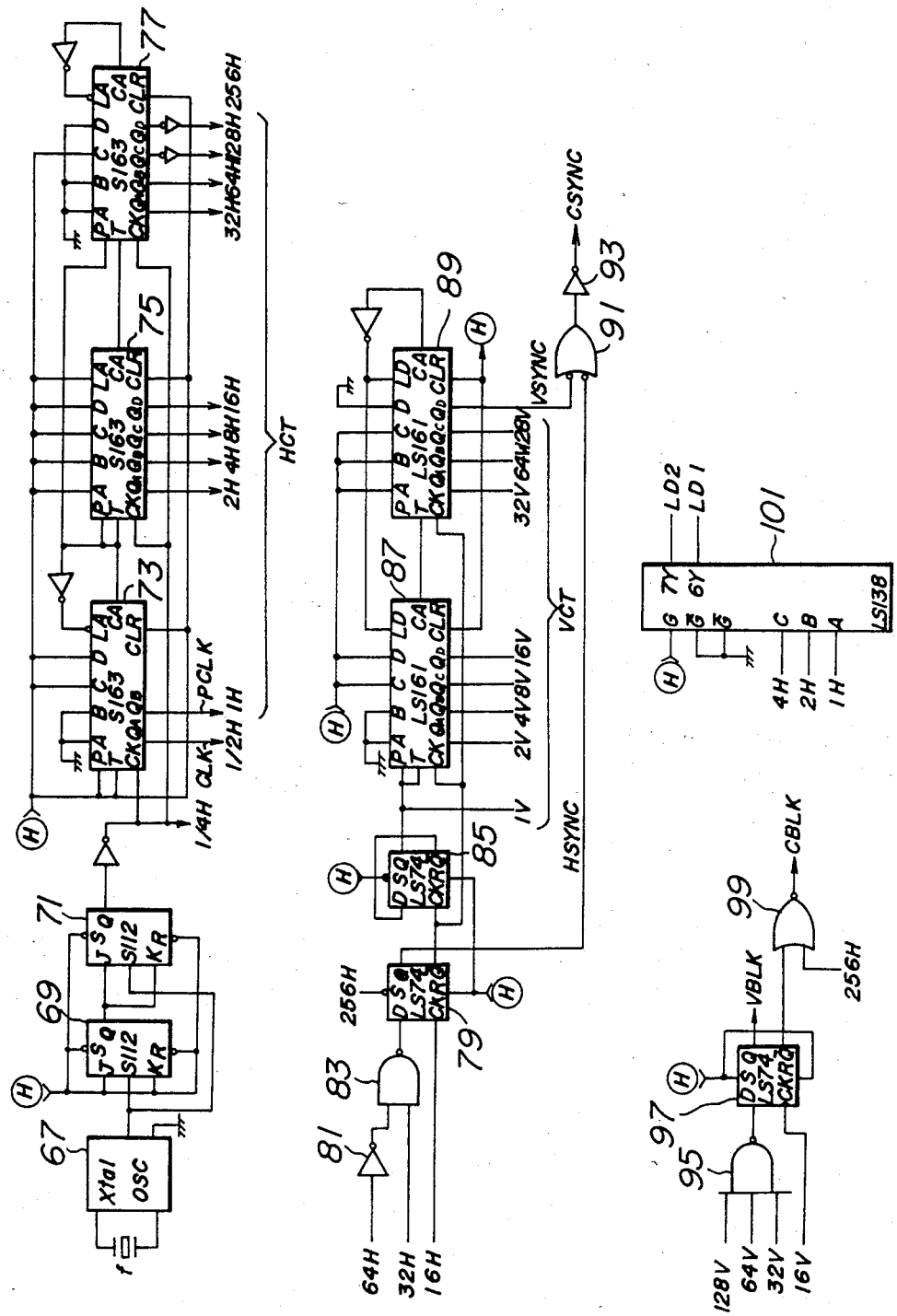
FIG. 26 is a circuit diagram showing a sync signal generator.

The sync signal generator 7 may be constructed as shown in FIG. 26. A conventional type crystal oscillator 67 generates an oscillating frequency f of 48.66 MHz which in turn is stepped down to $\frac{1}{2} \times f (=H/2)$ and then $\frac{1}{4} \times f (=H/4)$, respectively, by two JK flip-flops 69 and 71 (for instance, S112×2, the products of Texas Instruments). The H/4 output applied to three four-bit binary counters 73, 75 and 76 (for instance S163×3, the products of Texas Instruments) so that counter outputs H/2 and H are derived from the first counter 73; 2H, 4H, 8H and 16H outputs, from the second counter 75; and 32H, 64H, 128H and 256H outputs, from the third counter 77. Of these counter outputs, the 1H, 2H, 4H, 8H, 32H, 64H and 128H outputs are all used as the horizontal sync count HCT. The H/2 output is used as the clock signal CLK and H output, as the clock signal PCLK.

The 16H; output is applied to a clock terminal or pin CK of a D flip-flop (for instance, LS74, the product of Texas Instruments). The 64H output is applied through an inverter 81 to a NAND gate 83 to which is directly applied the 32H output. The output from the NAND gate 83 is applied to the D terminal of a D flip-flop 79 whose set input terminal S receives the 256H output, whereby the horizontal sync signal HSYNC is derived from the Q terminal of the D flip-flop 79. The $\overline{Q}$ output from the D flip-flop 79 is applied to the clock terminal CK of the next stage of a D flip-flop 85 (for instance, LS74, the product of Texas Instruments) so that the 1V output is obtained from the Q terminal and applied to a two-stage counter consisting of two four-bit binary counters 87 and 89 (for instance, LS161, the product of Texas Instruments) so that the 2V, 4V, 8V and 16V outputs are derived from the first binary counter 87 and the 32V, 64V, 128V and the vertical sync signal VSYNC, from the second counter 89. Of these outputs, 1V, 2V, 4V, 8V 16V, 32V, 64V and 128V are all used as the vertical sync count VCT. The horizontal and vertical sync signals HSYNC and VSYNC are applied to an OR gate 91, the output of which is applied to an inverter 93, so that the composite sync signal CSYNC is derived therefrom.

The 32V, 64V and 128V outputs are applied through a NAND gate 95 to the D input terminal of a D flip-flop 97 (for instance, LS74, the product of Texas Instruments), while the 16V output is applied to the CK input terminal thereof, whereby the vertical blanking signal VBLK is obtained from the Q output terminal thereof. The Q output from the D flip-flop 97 and the 256H output are applied to a NOR gate 99 so that the composite blanking signal CBLK is obtained therefrom.

The 1H, 2H and 4H outputs are applied to the A, B and C inputs of a decoder 101 (for instance, LS138, the product of Texas Instruments), respectively, so that the load signals LD1 and LD2 are derived from the 6Y and 7Y outputs, respectively.

Figure 27:
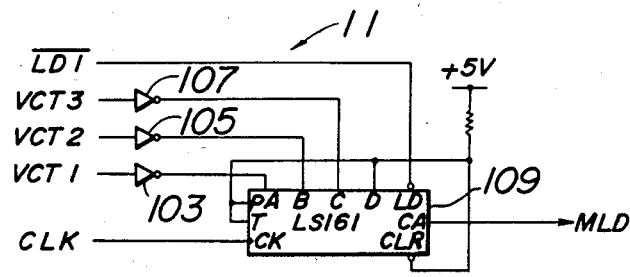
FIG. 27 is a circuit diagram showing a delay circuit for delaying a load signal.
Figure 28:
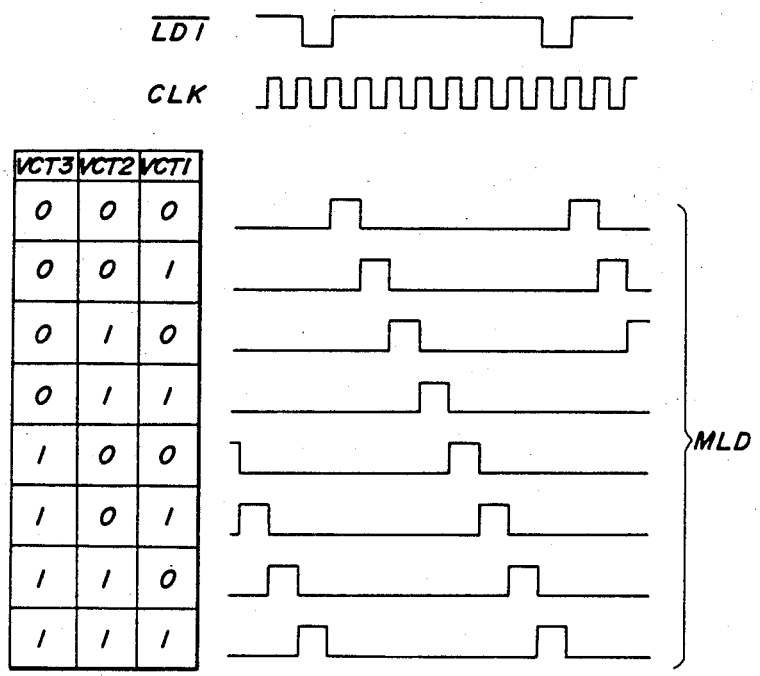
FIG. 28 is a timing chart used to explain the mode of operation of the delay circuit as shown in FIG. 27.

The delay circuit 11 may be constructed as shown in FIG. 27, wherein VCT1, VCT2 and VCT3 represent the respective three bits 2V, 4V and 8V of the vertical sync count VCT. VCT1, VCT2 and VCT3 are applied through inverters 103, 105 and 107, respectively, to select inputs A, B and C, respectively, of a four-bit binary counter 109 (for instance, LS161, the product of Texas Instruments). The load signal $\overline{LD1}$ is applied to the LD terminal thereof, while the clock signal CLK is applied as dot clock to the CK terminal thereof. Therefore, as shown in FIG. 28, eight load signals MLD to be applied to the parallel-to-serial converter 10 are obtained from the CA output terminal of the counter 109.

Figure 29:
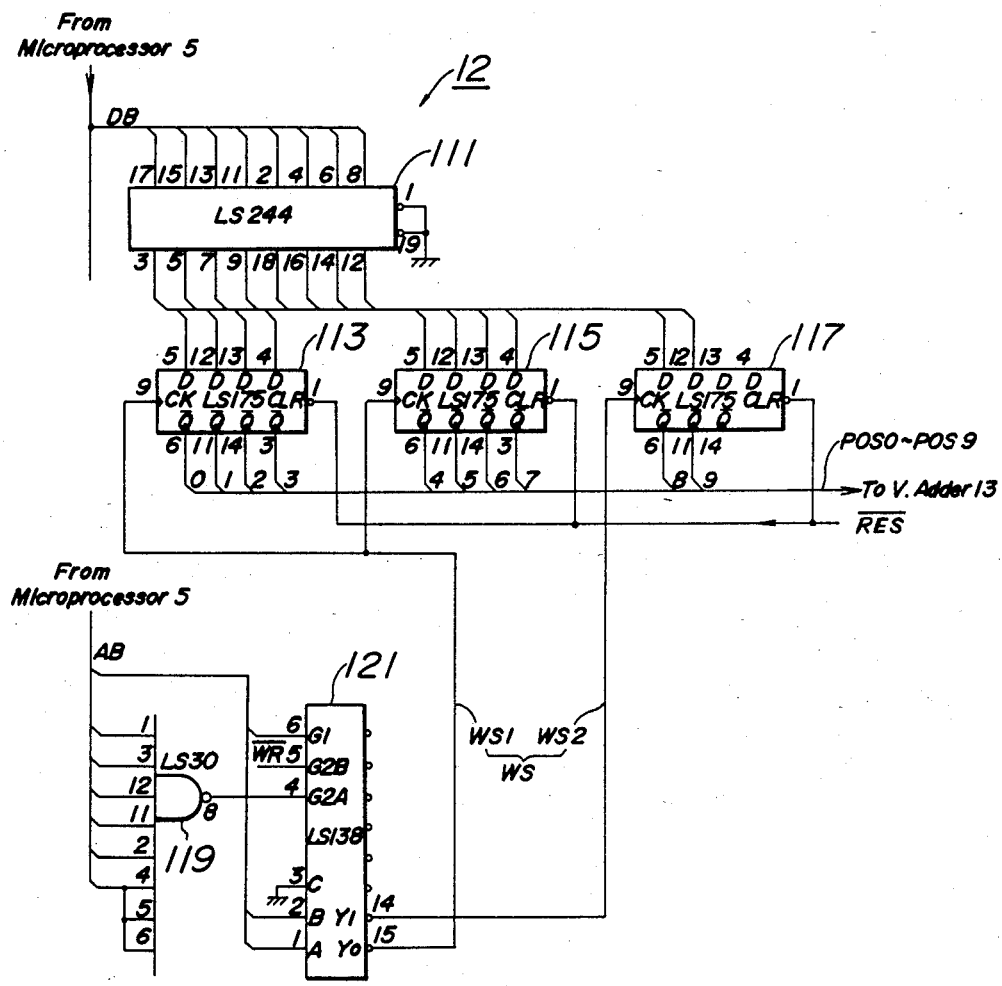
FIG. 29 is a circuit diagram showing position reference latch.

The position reference latch 12 may be constructed as shown in FIG. 29 and has a buffer amplifier 111 (for instance, LS244, the product of Texas Instruments). Two-dimensional position or location data transmitted through the data bus DB from the microprocessor 5 are transferred through the buffer amplifier 111 into flip-flops 113, 115 and 117 (for instance, LS175×3, the products of Texas Instruments). Addressing data transmitted through the adressing bus AD are applied through a NAND gate 119 (for instance, LS138, the product of Texas Instruments) to a decoder 121 (for instance, LS138, the product of Texas Instruments) so that two kinds of clock pulses WS1 and WS2 are derived therefrom and applied, as the write signal WS, to the clock terminals CK of the flip-flops 113, 115 and 117. In response to the write signal WS, the two-dimensional position data POS0-POS9 stored in the flip-flops 113, 115 and 117 are read out and transferred into the vertical adder 13 during a vertical blanking period. The reason why two kinds of clocks WS1 and WS2 are generated is that 8-bit data are sequentially transferred from the flip-flop 113, 115 and 117.

Figure 30:
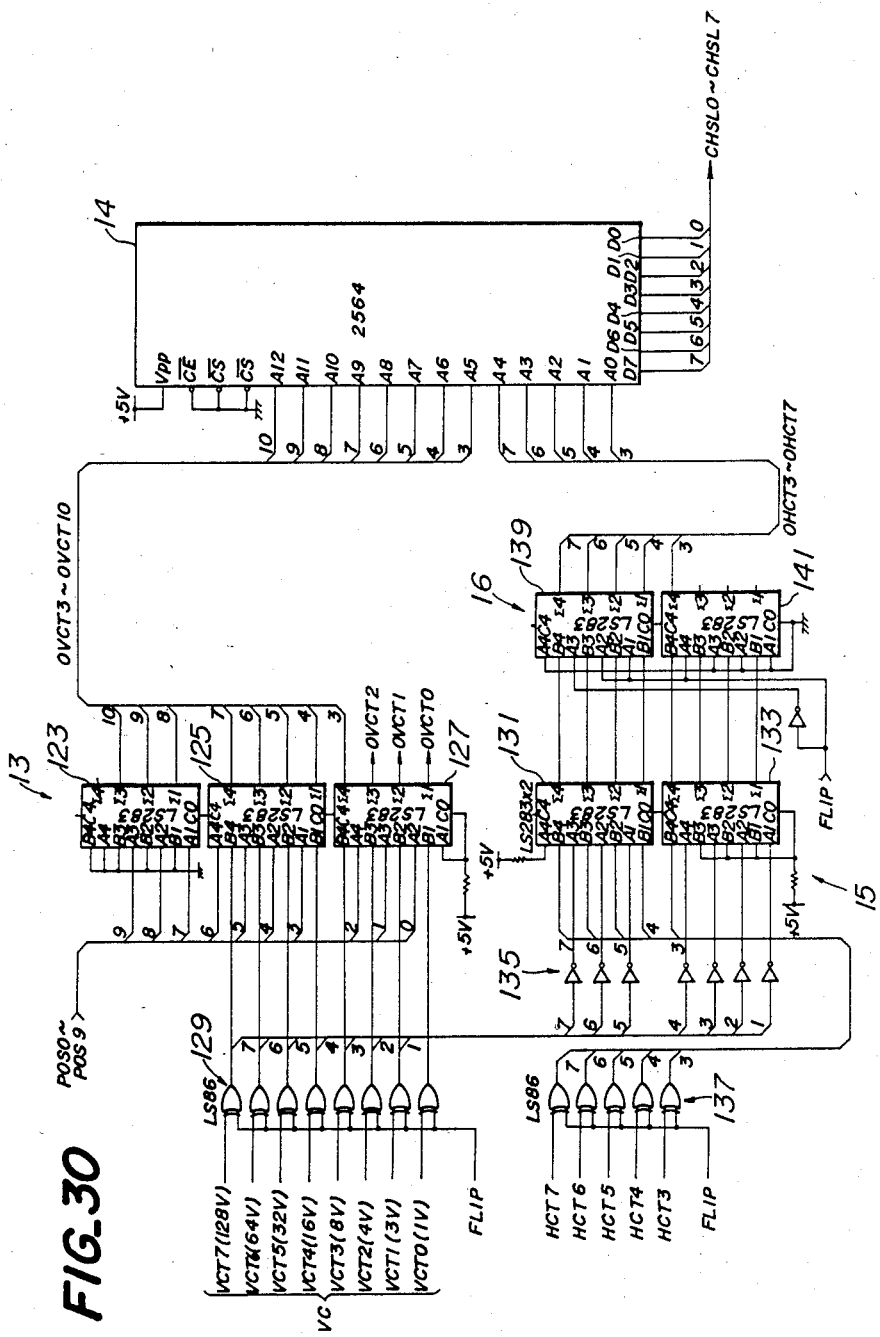
FIG. 30 is a circuit diagram showing an addressing stage.

The above-described two-dimensional position data POS0-POS9 are transferred into the vertical adder 13 which, as shown in FIG. 30 comprises three full-adders 123, 125 and 127 (for instance, LS283×3, the products of Texas Instruments). Respective signals VCT0-VCT7 (1V-128V) of the vertical sync count VCT are applied through an exclusive OR gate group 129 (for instance, LS86, the product of Texas Instruments) to the full adders 125 and 127, whereby the vertical offset sync count OVCT is derived from the full adders 123, 125 and 127. Three lower-significant bits OVCT0, OVCT1 and OVCT2 of the offset vertical sync count OVCT are transferred to the pattern programmable ROM 17, while the remaining higher significant bits OVCT3-OVCT10 are transferred into the background map PROM 14 (for instance, 2564, the product of Texas Instruments).

In FIG. 30, is shown the horizontal adder 15 comprising two full adders 131 and 133 (for instance, LS283×2, the products of Texas Instruments). The outputs from the exclusive OR gate group 129 are applied through a group of inverters 137 to the full adders 131 and 133. Of the horizontal sync count HCT, the 8H, 16H, 32H, 64H and 128H outputs are also applied through the group of exclusive OR gates 137, as signals HCT3, HCT4, HCT5, HCT6 and HCT7, to the full adders 131 and 133. The HCT data is multiplied by a predetermined constant by suitably selecting the input terminals or pins of the full adders 131 and 133. The sum outputs from the full adders 131 and 133 are applied to the constant adder 16 comprising full adders 139 and 141 (for instance, LS283×2, the products of Texas Instruments). The two groups 129 and 131 of exclusive OR gates are provided so that two game players on the opposite sides of the three-dimensional image display screen of a game machine can reverse the displayed image upside down, whereby the displayed picture can be moved from one player to the other. To this purpose, the picture flip signal FLIP which is generated automatically by the microprocessor 5 whenever a game is over is applied to all the exclusive OR gates in the groups 192 and 137 from the microprocessor 5.

Still referring to FIG. 30, of the offset horizontal sync count OHCT obtained from the constant adder 16, the OHCT3-OHCT7 outputs are transferred into the background map PROM 14 which receives the OVCT3-OVCT10 outputs as addressing inputs. Therefore, data CHSL0-CHSL7 representative of patterns of the background scene are read out from the PROM 14 and supplied to the addressing input terminals or pins A3-A10 of the pattern PROM17.

Figure 31:
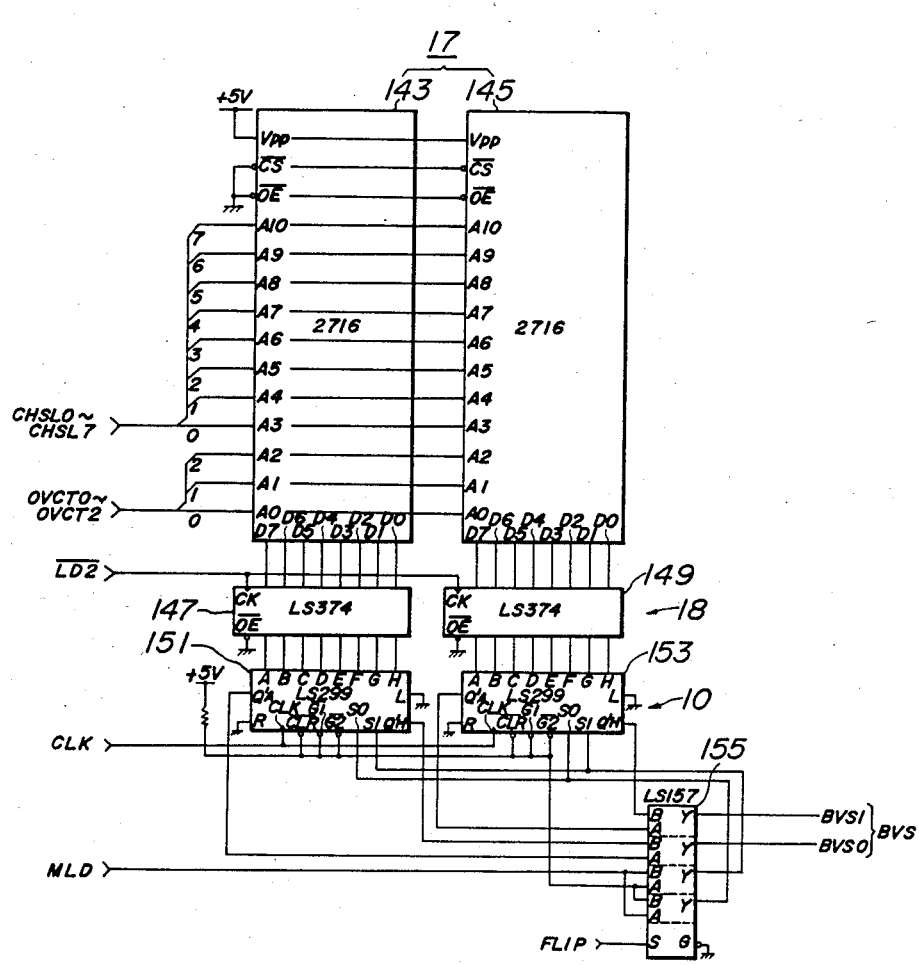
FIGS. 31 and 32 are circuit diagrams showing a pattern display stage.

In FIG. 31 is shown the pattern PROM 17 comprising PROMs 143 and 145 (for instance, 2716×2, the products of NEC) and 144 (for instance, TMS2564, the product of Texas Instruments). The PROMs 143 and 145 store the pattern of backgrounds. The OVCT0-OVCT2 outputs derived from the full adder 127 are applied to the addressing input terminals A0-A2 of the PROMs 143 and 145. Pattern data outputs read out from the PROMs 143 and 145 are transferred into and stored temporarily in latching circuits 147 and 149 (for instance, LS374×2, the products of Texas Instruments) which constitute the latch 18 at the timing of the load signal $\overline{LD2}$. The contents in the latching circuits 147 and 149 are read out and transferred in parallel into the parallel-to-serial converter 10 comprising shift registers 151 and 153 (for instance, LS299, the products of Texas Instruments). More particularly, the clock signals CLK are applied to the clock input terminals CLK of the shift registers 151 and 153.

The parallel contents in the latching circuits 147 and 149 are stored in the shift register 151 and 153 when the terminals S0 and S1 receive high level. When the terminal S0 has high level and the terminal S1 has low level, the stored data in the shift registers 151 and 153 shift rightwards, so that serial outputs are derived from terminals Q'H. When the terminal S0 has low level and the terminal S1 has high level, the stored data in the shift registers 151 and 153 shift leftwards, so that serial outputs are derived from terminals Q'A. In this manner, the parallel data is converted into the serial data.

In case of a single player, the polarities of the terminals S0 and S1 may be fixed to either of the right or left shift. In case of two players, it is preferable that the right and left shifts are alternately changed by the picture flip signal FLIP, so that the picture on the display screen is turned upside down alternately for the respective players. This alternate change is performed by a multiplexer 155 (for instance, LS157, the product of Texas Instruments). The left and right shift outputs are supplied from the terminals Q'A and Q'H to the terminals A and B, respectively. In addition, a high level and the delayed load signal MLD are also applied to the further terminals A and B, respectively and the picture flip signal FLIP is applied to the select terminal S, so that the signal MLD and a high level are selectively derived from the output terminals Y and transferred to the terminals S0 and S1 to control the polarities of the terminals S0 and S1. When the signal MLD is at a high level, both the terminals S0 and S1 receive a high level, so that the write-in in the shift registers 151 and 153 is performed. When the signal MLD is at a low level, one of the terminals S0 and S1 receives a high level and the other terminal receives a low level. In response to the inversion of the picture flip signal FLIP, the polarities of these terminals S0 and S1 are also inverted, so that the picture on the display screen is turned upside down. In this way, the multiplexer 155 delivers the BVS output having BVS0 and BVS1 corresponding to selected one of the left and right shift outputs.

The color data of the background are stored in the PROM 144. The signals OHCT3-OHCT7 are applied to the address terminals $A_0-A_4$ of the PROM 144 from the full adder 139. The signals OVCT3-OVCT10 are supplied to the address terminals $A_5-A_{12}$ from the full adders 123, 125 and 127. The read out color data from the PROM 144 are stored in a latch 146 (for instance, LS374, the product of Texas Instruments) by the clock signal 4H. The latched color data is further transferred to a latch 148 (for instance, LS373, the product of Texas Instruments) by the load signal LD2 in synchronism with latching of the latches 147 and 149. The thus latched outputs are applied to a flip-flop 150 (for instance, LS377, the product of Texas Instruments) and are stored in the flip-flop by the timing of the clock signal CLK when a signal $\overline{\text{MLD}}$ obtained from the delayed load signal MLD becomes negative. The stored outputs BVSC showing background color data are applied to a multiplexer 161 which will be described later.

Figure 32:
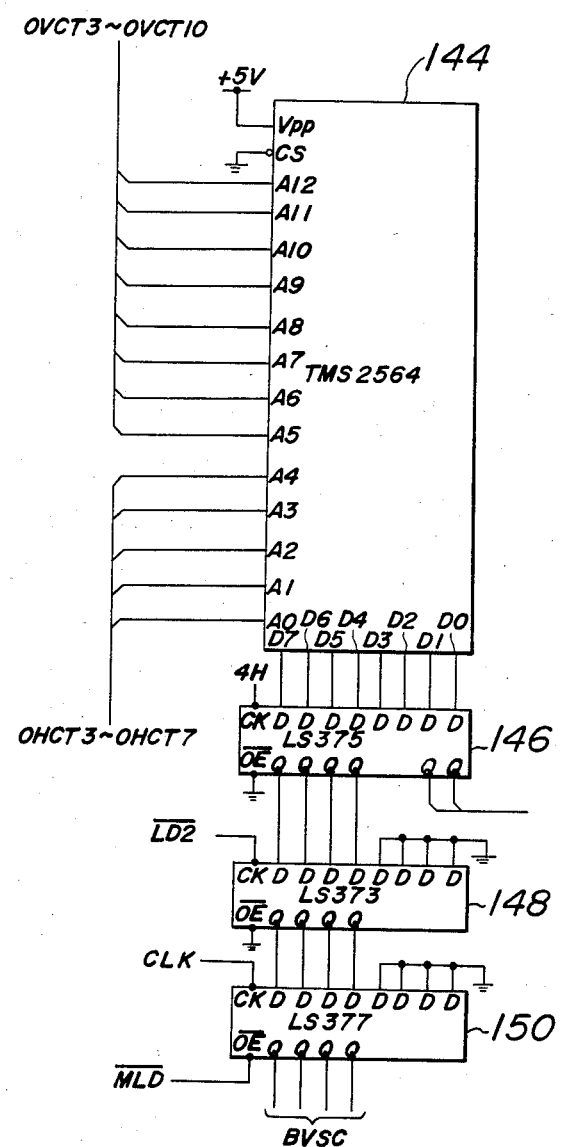

In FIG. 32, is shown in detail the construction of the priority processing unit generally indicated by the reference numeral 19. Of the character video signal CVS from the character display 8, CVSP representative of the pattern of a character to be displayed and CVSC representative of the color of the character are applied to the input terminals A of a multiplexer 157 (for instance, LS157×2). Of the moving object video signal from the moving object display 9, MVSP representative of the pattern of a moving object to be displayed and MVSC representative of the color of the moving object are applied to the B input terminals of the multiplexer 157. The signal CVS1 is applied through a NOR gate 159 to the selection terminal or pin S of the multiplexer 157.

When the output of the NOR gate 159 is at a low level, that is, when either of the signals CVS1 is at a high level, the A input terminals are selected, so that the priority is assigned to the character video signal and subsequently the character video signal is derived form the Y terminals and applied to the A terminals of a multiplexer 161 (for instance, LS157×2) in the next stage. Of the background video signal BVS, BVSP representative of the pattern of a background and BVSC representative of the color thereof are applied to the B terminals of the multiplexer 161. Of the outputs from the multiplexer 157, those representative of patterns are applied to a NOR gate 163, the output of which is supplied to the selection terminal S of the multiplexer 161, so that the priority is assigned to the output from the multiplexer 157 over the background video signal BVS and subsequently the output from the multiplexer 157 is derived from the multiplexer 161. Thus, the higher priority is assigned to the character video signal over the moving object video signal, while the higher priority is assigned to the moving object video signal or character video signal over the background video signal. The thus obtained display video signal DVS is applied to an RGB converter 165 of the conventional type in the video display 20, so that R, G and B signals are derived therefrom. It should be noted that the composite blanking signal CBLK is also applied to the RGB converter 165.

Next referring to FIG. 33, the character display 8 and the moving object display 9 will be described in detail below. First, the character display 8 will be described. During a horizontal and a vertical blanking period, in response to addressing input CAD transmitted through the addressing bus AB, character data for one picture frame transferred from the microprocessor 5 through the data bus DB are stored in a character RAM 167 (for instance, 2114, the product of Intel). In this case, a write-enable signal WE consisting of $\overline{\text{WR}}$ and $\overline{\text{RD}}$ is applied to the character RAM 167. In response to the read timing signal VCT, pattern data corresponding to the character codes supplied from the character RAM 167 are read out from a character pattern ROM 169 (for instance, 2716, the product of NEC) and are applied to a parallel-to-serial converter 171 (which comprises a shift register such as LS299, the product of Texas Instruments). The character pattern data CVSP is derived from the converter 171 at the timing of the clock signal CLK. The color of a character is uniquely determined in accordance with a position on the screen. In response to the vertical and horizontal sync counts VCT and HCT, color data CVSP representative of a color or colors of the pattern data CVSC is read out at an address determined by the sync counts VCT and HCT in a color ROM 173 (for instance, MB7052, the product of Fujitsu).

The data from the data bus DB is stored at an address indicated by the address data CAD in the character RAM 167 at the timing of the write signal $\overline{\text{WR}}$ during the vertical and horizontal blanking periods. The thus stored data is read out at an address determined by the sync counts HCT and VCT which are applied to the RAM 167 during the display period. The address data thus read out is supplied to the character pattern ROM 169 as an address data for reading out a character data in the character pattern ROM 169. The vertical sync count VCT is applied to the character pattern ROM 169, so that a desired data to be displayed is selected from data on eight scanning lines of a cell contained in the address designated by the character RAM 167.

In the moving object display 9, during a vertical blanking period, in response to the adressing signal MAD supplied through the adressing bus AB, data of a moving object transmitted from the microprocessor 5 through the data bus DB are stored into a first target RAM 175 (for instance, 2114AL, the product of Intel), data representing H and V data which represent the location of the moving object, a pattern code and a color code. The data stored in the first target RAM 175 may contain all the data of a plurality of moving objects which are displayed in the same picture frame. The data stored in the first target RAM 175 are read out in response to the horizontal sync count HCT.

A target selector 177 (which may consist of a full adder LS283, flip-flops LS273 and LS74, a multiplexer LS157 and gates) decides whether or not the data from the RAM 175 should be displayed on a scanning line to be traced next. This decision is perfomed with respect to all of the moving objects on one picture frame. The results of these decisions are transferred to a second target RAM 179 (for instance, 93419, the product of Fairchild). The above operations are all performed during the display period of the preceeding scanning line.

Data stored in the second target RAM 179 are codes representing the patterns and colors of moving objects to be displayed during the horizontal blanking period. Pattern data specified by the code read out form the second target RAM 179 are read out from a target pattern ROM 181 (for instance, 2564, the product of Texas Instruments) and supplied to a parallel-to-serial converter 183 (for instance, a shift register LS299, the product of Texas Instruments). In response to the clock signal H/4 the converter 183 converts parallel data into serial data which in turn are stored in a third target RAM 185 (for instance, 93422A, the product of Fairchild). Color codes are stored in a color code latching circuit 187 (for instance, LS377, the product of Texas Instruments) from which the color codes are transferred into the third target RAM 185.

Data read out from the second target RAM 179 are also supplied to an H decision circuit 189 (which comprises, for instance, a counter S163, the product of Texas Instruments) which specifies the addresses on a horizontal scanning line at which the pattern and color signals are displayed. The pattern and color are also stored in the third target RAM 185 by the thus specified addresses.

The contents in the third target RAM 185 are supplied as the moving object video signal MVS to the multiplexer 157 as described above. The multiplexer 157 assigns the higher priority to the character video signal CVS over the moving object video signal MVS as described before. The moving object video signal MVS is displayed along the next scanning period.

In summary, according to the present invention, the displayed picture can be scrolled obliquely by using ROMs and RAMs with small capacities, so that realistic pictures can be displayed and thus players or operators become tense and feel as if they were in the true three-dimensional space displayed. In addition, the shadow of a moving target can be cast over the background, so that the altitude of the moving object can be represented by the distance between the moving object and its shadow and consequently the displayed picture becomes more realistic. Moreover, a moving object can be so steered that it can pass over or collide with a building in the background, so that the picture representation becomes more realistic in the sense of the three-dimensional image display. Furthermore, the upper left and lower right triangle regions outside the scrolling picture can be effectively used for the stationary representation of desired characters and symbols so that the whole picture frame or window may be fully utilized for display.

What is claimed is:

1. A three-dimensional image display system, comprising:
    (a) memory means for storing video information in the form of a prespective view of a background scene;
    (b) reading means for reading out said video information stored in said memory means while scrolling the stored video information in an oblique direction with respect to said perspective view; and
    (c) display means, including a display screeen and responsive to the read out scrolled video information, for displaying said read out video information in the form of a perspective view on said display screen with the displayed picture being obliquely scrolled, with respect to the horizontal axis of said display screen, in said display screen in accordance with the lapse of time.

2. A three-dimensional image display system as defined in claim 1, further comprising:
    (A) means for generating vertical sync counts and horizontal sync counts;
    (B) said memory means comprising;
        (a) pattern memory means for storing image forming units; and
        (b) image memory means for storing the addresses of the image forming units in said pattern memory means, said image forming units relating to a plurality of cells forming in combination said video information;
    (C) said reading means comprising;
        (a) position reference latching means for storing image positions of images which are displayed during a vertical scanning period on said display means in the presentation of said perspective view;
        (b) vertical adder means for offsetting said vertical sync counts in response to the position data from said position reference latching means; and
        (c) horizontal adder means for offsetting said horizontal sync counts in response to said vertical sync counts;
    (D) means for accessing said image memory means in response to outputs from said horizontal and vertical adder means to read out an address of said pattern memory;
    (E) means for accessing said pattern memory means in response to said address read out of said image memory means to read out pattern data for each of said cells from said pattern memory means;
    (F) means for temporarily storing the read out pattern data;
    (G) means for time sequentially reading out the temporarily stored pattern data at the timing of horizontal scanning to form an image video signal; and
    (H) means for supplying said image video signal to said display means.

3. A three-dimensional image display system as defined in claim 2, wherein said image memory means comprises programmable read only memory means; and
    said pattern memory means comprises programmable read only memory means.

4. A three-dimensional image display system as defined in claim 2, wherein said pattern memory means comprises a programmable read only memory means; and
    said image memory means comprises random access memory means, said video information being stored into said random access memory means only during a vertical blanking period and a horizontal blanking period.

5. A three-dimensional image display system as defined in claim 4, wherein a program for processing said video information is stored in exterior peripheral memory means which can be accessed by microprocessor means so that the read out video information read out from said exterior peripheral memory means is stored in said random access memory means.

6. A three-dimensional image display system as defined in claim 1, wherein predetermined data are displayed in data areas outside an image area of said display screen, with this obliquely scrolling picture being displayed in said image area.

7. A three-dimensional image display system as defined in claim 6, further comprising:
    (a) data video display means for generating data video signals to be displayed in said data areas;
    (b) moving object display means for generating moving object video signals for displaying at least one moving object which is displayed in such a way that said moving object moves relative to said obliquely scrolling picture; and
    (c) said display means having priority selection means for assigning priorities in the order of said data video signals, said moving object video signals and said image video signals, whereby said data video signals, moving object and image video signals are displayed on said display screen in the order of said priorities.

8. A three-dimensional image display system as defined in claim 7, wherein said moving object display means comprises means for generating shadow video signals for displaying a shadow of said moving object on said obliquely scrolling picture in a manner that said shadow moves in relation to said moving object.

9. A three-dimensional image display system as defined in claim 7, further comprising:
means for determining an altitude of said moving object with respect to said obliquely scrolling picture; and
control means responsive to the output from said altitude determining means for controlling said moving object in such a way that said moving object passes over or collides with an image of an obstacle in said obliquely scrolling picture.

10. A three-dimensional image display system as defined in claim 7, further comprising control stick switching means for controlling the movement of said moving object with respect to said obliquely scrolling picture in the longitudinal, transverse and vertical directions thereof.

11. A three-dimensional image display system as defined in claim 1, wherein said perspective view is formed so as to converge at a down point in the longitudinal direction of said perspective view.

12. A three-dimensional image display system as defined in claim 1, wherein said perspective view is formed so as to converge at an end point in the direction in which said perspective view is scrolled.

13. A three-dimensional image display system as defined in claim 1 wherein said reading means scrolls said stored video information in the longitudinal direction of said perspective view.

14. A three-dimensional image display system, comprising:
video display means for displaying an image on a display screen;
first means for providing video information in the form of a perspective view of a background scene;
second means for designating a picture to be displayed during a vertical blanking period of the display means, said picture being a portion of the perspective view of a background scene;
third means for storing image forming units which form said video information;
fourth means for designating a vertical scanning position of the designated picture for every width of an image forming unit;
fifth means for designating a horizontal scanning position of the designated picture by offsetting the horizontal scanning position in proportion to an inclination angle of the perspective view for every width of an image forming unit;
sixth means for shifting the entire horizontal scanning position by a predetermined distance in a horizontal direction;
seventh means, responsive to the outputs from said fourth means and said sixth means, for designating addresses in said third means for every image forming unit to obtain a picture map;
eighth means for reading out prespective picture elements on the horizontal line of every image forming unit from the designated address in said third means;
ninth means for temporarily storing the contents of the plurality of picture elements read out from said eighth means;
tenth means for generating a picture clock; and
eleventh means for reading out said contents of the picture elements from said ninth means in the sequence of the pictures to be scrolled in synchornism with said picture clock so that the scanning position of the respective scanning line is offset in accordance with said inclination angle, and for feeding the read out contents of said ninth means to said video display means to provide a moving perspective view of the background scene which moves, on said display screen, obliquely to the horizontal axis of said display screen.

15. A three-dimensional image display system as defined in claim 14, wherein said first means and said third means are formed by sharing one read only memory.

16. A three-dimensional image display system as defined in claim 14, wherein: said first means is formed by a read only memory and said seventh means is formed by a random access memory; and the map stored in said random access memory is rewritten by a pattern read out from said read only memory during the vertical blanking period to form the picture to be displayed subsequently.

17. A three-dimensional image display system as defined in claim 14, wherein: said first means is formed by an external memory and said seventh means is formed by a random access memory; and the map stored in said random access memory is rewritten by a pattern read out from said external memory during the vertical blanking period to form the picture to be displayed subsequently.

18. A three-dimensional image display system as defined in claim 14, wherein said first means is formed by a read only memory or an external memory and a twelfth means for forming a pattern; wherein said seventh means is formed by a random access memory; and wherein a pattern read out from said read only memory or said external memory during the vertical blanking period is added to a pattern formed by said twelfth means to form the picture to be displayed subsequently.

19. A three-dimensional image display system as defined in claim 14, wherein: said fourth means is a vertical adder for adding a vertical sync count to a first data for designating the vertical position of one picture so as to offset said vertical sync count by said first data; said fifth means is a horizontal adder for adding second data, obtained by multiplying said vertical sync count by a constant, to a horizontal sync count to offset said horizontal sync count by said second data; said sixth means is a constant adder for adding a constant to the offset horizontal sync count to shift said horizontal scanning position by said constant in a horizontal direction; saud seventh means is a picture map memory accessed by the offset vertical sync count and the constant-added offset horizontal count; and said third means is a read only memory accessed by the picture map read out from said picture map memory.

* * * * *

UNITED STATES PATENT AND TRADEMARK OFFICE
CERTIFICATE OF CORRECTION

PATENT NO. : 4,600,200
DATED : July 15th, 1986
INVENTOR(S) : Oka et al

It is certified that error appears in the above-identified patent and that said Letters Patent is hereby corrected as shown below:

In the heading of the patent, under [75], the inventor's name should appear as "Masayo Oka".

Signed and Sealed this

Fourth Day of November, 1986

[SEAL]

Attest:

DONALD J. QUIGG

Attesting Officer

Commissioner of Patents and Trademarks